(12) United States Patent
Fang et al.

(10) Patent No.: US 6,788,481 B2
(45) Date of Patent: Sep. 7, 2004

(54) PROCESS FOR MEASURING NONLINEAR TRANSITION SHIFT (NLTS) AT HIGH RECORDING DENSITIES WITH A GIANT MAGETORESISTIVE (GMR) HEAD

(75) Inventors: Peter Chen-I Fang, San Jose, CA (US); Xiangjun Feng, San Jose, CA (US); Terence Tin-Lok Lam, Cupertino, CA (US); Zhong-Heng Lin, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 10/104,422

(22) Filed: Mar. 21, 2002

(65) Prior Publication Data

US 2003/0179478 A1 Sep. 25, 2003

(51) Int. Cl.[7] .............................................. G11B 27/36
(52) U.S. Cl. ............................ 360/31; 360/45; 360/53; 360/51
(58) Field of Search ............................ 360/31, 45, 53, 360/51; 324/210, 212, 226

(56) References Cited

U.S. PATENT DOCUMENTS

| 4,891,718 | A | * | 1/1990 | White ........................ 360/46 |
| 5,493,454 | A | | 2/1996 | Ziperovich et al. |
| 5,583,705 | A | | 12/1996 | Ziperovich et al. |
| 5,917,855 | A | | 6/1999 | Kim |
| 6,025,712 | A | | 2/2000 | Mian |
| 6,081,394 | A | | 6/2000 | Tsuboi |
| 6,134,691 | A | | 10/2000 | Hirasaka |
| 6,212,024 | B1 | | 4/2001 | Igarashi et al. |

FOREIGN PATENT DOCUMENTS

JP    10172105    6/1998

OTHER PUBLICATIONS

Non–Linear Transition Shift, LeCroy, Apr. 24, 2001 (from "lecroy.com/applications").
IEICE Trans. Electronics, vol. E80–C, No. 9, Sep. 1997, "An Improved Technique to Measure Nonlinear Phase Shift and Amplitude Distortion".
IEEE Trans. on Magnetics, vol. 33, No. 5, Sep. 1997, "Novel Method for Real–Time Monitoring of Non–Linear Transition Shift".

(List continued on next page.)

Primary Examiner—Alan T. Faber
(74) Attorney, Agent, or Firm—Ervin F. Johnston

(57) ABSTRACT

A nonlinear transition shift (NLTS) measurement procedure for read/write heads employing a giant magnetoresistive (GMR) merged heads. The method of this invention includes the pulse-shape distortion effects on recording nonlinearity, which can significantly affect the existing theoretical formulae for calculating nonlinearity correction factor from measured partial erasure values, and second-order approximation of equation of NLTS and nonlinearity correction factor. Transition broadening effects (TBE) and partial erasure (PE) are incorporated in the NLTS measurement procedure to permit accurate isolation of the NLTS from the unrelated TBE/PE and GMR nonlinear transfer characteristic (NTC). First, a fifth harmonic elimination (5HE) test is performed at bit period T to measure a first nonlinearity value X. Then two partial erasure (PE) tests are done at two different densities, one below the PE threshold to measure a second nonlinearity value $X_S$ and the other at the same density as the 5HE test to measure a third nonlinearity value $X_h$. Finally, the NLTS is computed by combining the first, second and third nonlinearity values.

8 Claims, 10 Drawing Sheets

OTHER PUBLICATIONS

*IEEE Trans. on Magnetics*, vol. 29, No. 6, Nov. 1993, "Studies of Nonlinear Bit Shift and Partial Erasure Using Pseudo–Random Sequence".

*IEEE Trans. on Magnetics*, vol. 35, No. 6, Nov. 1999, "New Frequency–Domain Technique for Joint Measurement of Nonlinear Transition Shift and Partial Erasure".

*IEEE Trans. on Magnetics*, vol. 31, No. 6, Nov. 1995, "Nonlinearity Measurements and Write Precompensation Studies for a PRML Recording Channel".

*IEEE Trans. on Magnetics*, vol. 30, No. 6, Nov. 1994, "A Generalized Frequency Domain Nonlinearity Measurement Method".

*IEEE Trans. on Magnetics*, vol. 34, No. 4, Jul. 1998, "A Theoretical Study of Nonlinear Transition Shift".

*IEEE Trans. on Magnetics*, vol. 35, No. 6, Nov. 1999, "Magnetoresistive Read Nonlinearity Correction by a Frequency–Domain Approach".

*IEEE Trans. on Magnetics*, vol. 30, No. 6, Nov. 1994, "A Time–Correlation Method of Calculating Nonlinearities Utilizing Pseudorandom Sequences".

*IEEE Trans. on Magnetics*, vol. 33, No. 5, pt. 1, Sep. 1997, "Experimental and theoretical studies of nonlinear transition shift in metal evaporated tape".

\* cited by examiner

PROCESS FOR MEASURING NONLINEAR TRANSITION SHIFT (NLTS) AT HIGH RECORDING DENSITIES WITH A GIANT MAGETORESISTIVE (GMR) HEAD

BACKGROUND OF THE INVENTION

1. Field of the Invention

This invention relates to measuring the nonlinear transition shift (NLTS) in a magnetic data storage system and more particularly to determining NLTS in a high-density data store having a readback channel employing a giant magnetoresistive (GMR) sensor.

2. Description of the Related Art

Introduction

In a typical recording channel, nonlinearities can occur for several different reasons during both writing and reading. Firstly, it is well-known that when closely-spaced data bits are written on a magnetic storage medium, such as a magnetic disk, the magnetic transition positions are shifted by the magnetostatic interactions between adjacent transitions. This shift, herein denominated nonlinear transition shift (NLTS), contributes to the total recording channel nonlinearity. The art is replete with descriptions of NLTS; for example, reference is made to Zhang et al., "A Theoretical Study of Nonlinear Transition Shift," *IEEE Trans. Magn.*, Vol.34, pp. 1955–1957, July 1998. For example, in FIG. 1, a dibit pair of flux transitions 30 and 32 are illustrated schematically as adjacent flux reversals separated by the bit cell length B in a recording medium 34. The NLTS is shown conceptually as a shift of d in flux transition 32 to a new position by virtue of the magnetostatic interactions between the transitions.

Secondly, a closely-adjacent recorded transition may also cause a transition broadening effect (TBE) during the writing of the next transition because of the consequential reduction in recording field gradient induced magnetostatically by the adjacent transition. Reduction of the recording field gradient broadens the width of the resulting transition in the recording medium. Moreover, as the transition spacing is reduced, causing two adjacent transitions to approach one another, the opposing magnetostatic potentials may locally annihilate one another in an unpredictable fashion; a condition herein denominated partial erasure (PE). As a result of PE, a single transition is broken into many transition segments or islands distributed over the locale intended for the single transition. PE arises gradually as transition spacing is reduced and is exacerbated in closely-spaced transitions because of TBE. The art is also replete with descriptions of TBE and PE; for example, reference is made to Che, "Nonlinearity Measurements and Write Precompensation Studies for a PRML Recording Channel," *IEEE Trans. Magn.*, Vol.31, pp. 3021–3026, November 1995. Although the two nonlinear phenomena, PE and TBE, are different microscopically and arise from different causes, the resulting playback waveform distortions are similar and may together be reasonably assumed to be a single recording channel nonlinearity herein denominated as TBE/PE or simply PE.

Finally, the giant magnetoresistive (GMR) sensor is known to exhibit severe nonlinearity because of its nonlinear response to magnetic fields. During reading, this nonlinearity is manifested as a nonlinear transfer curve (NTC) of the GMR sensor. GMR heads are widely preferred in magnetic recording because of their high signal output levels compared to earlier MR heads and inductive heads, but their nonlinear signal response characterized by NTC is also well-known. The art is replete with descriptions of the transfer characteristics of magnetoresistive (MR) and GMR sensors; for example, reference is made to Cai, "Magnetoresistive Read Nonlinearity Correction by a Frequency-Domain Approach," *IEEE Trans. Magn.*, Vol.35, pp. 4532–4534, November 1999.

NLTS can largely degrade the performance of the partial-response maximum-likelihood (PRML) channel that is widely preferred in disk-drive read channels. A PRML detector expects playback waveforms to be composed of a linear superposition of isolated pulses (transition detections) and its performance is significantly degraded by nonlinear distortion of the playback pulses, whether from NLTS, TBE/PE or the NTC of a GMR readback sensor.

Fortunately, in the recording channel, the effects of NLTS can be reduced significantly by properly controlling the recording timing of each transition. In particular, it is possible to compensate for the NLTS effect by pre-shifting the transition positions during the write operation, but this requires some means for accurately measuring the NLTS for the particular write head, transition spacing and recording medium employed. There are several different methods known in the art for measuring NLTS. Currently, the most reliable and popular NLTS test method used in manufacturer testing lines at recording head companies is the fifth-harmonic elimination (5HE) method. However, the accuracy of 5HE NLTS measurements is significantly affected by the other two kinds of nonlinearity described above, TBE/PE and NTC. Because each of these three kinds of nonlinearity, NLTS, TBE/PE and NTC, arises from a different component, such as writer, reader or data storage medium, in a different manner during the recording process, it is very important for head designers to distinguish among them and to effectively measure each of them accurately and separately. The NLTS must be distinguished from the TBE/PE nonlinearities, which also can be minimized by imposing a lower limit on transition spacing. It is also possible to compensate for the NTC of a GMR sensor in the readback channel, provided that the NTC can be measured and distinguished from the other nonlinearities. Accordingly, the accurate testing and quantitative determination of each of these non-linearities in a playback waveform is important for optimizing performance of a PRML detector. A well-known problem in the art is how to accurately separate the contributions of each nonlinearity (NLTS, TBE/PE and NTC) from the overall nonlinear distortion that can be measured in the recording channel and the art is replete with proposals for measuring and compensating for these recording channel nonlinearities. Several useful testing methods have been developed in the art for characterizing playback waveform nonlinearities, which may be loosely classified as time-domain methods and frequency-domain methods.

The dominant time-domain technique for measuring NLTS, herein denominated the Pseudo-Random Sequence (PRS) Method, was first proposed by Palmer et al. (Palmer et al., "Identification of Nonlinear Write Effects Using a Pseudorandom Sequence," *IEEE Trans. Magn.*, Vol. 23, pp. 2377–2379, September 1987). By recording and reading a pseudorandom sequence (PRS) of transitions and then processing it with Fourier transform methods, the nonlinearities are identified from small perturbations or echoes, usually well-separated from the main linear part of the response of the system. The original pseudorandom sequence is deconvolved from the playback waveform to yield the linear dipulse response and any echoes arising from nonlinear effects. By measuring the amplitude of these echoes relative to the main dipulse response, the nonlinear distortion may be quantitatively assessed as a percentage of the primary dipulse signal level. This PRS method can be used to systematically analyze all nonlinear mechanisms and to characterize the entire recording channel. However, this method requires a sophisticated measurement procedure that includes complicated waveform triggering, data acquisition and manipulations. The exact original data sequence must be known to process the data. Any noise and the DC offset in the readback waveform may give rise to a considerable error with this method. In most cases only one nonlinear mechanism dominates and using this complex and difficult method is inefficient.

Other practitioners have proposed various improvements and simplifications to the original PRS method, often by suggesting useful assumptions about the various nonlinearity phenomena and simplifying the procedure to capitalize on the new assumptions. For example, Che et al. (Che et al., "A Time-Correlation Method of Calculating Nonlinearities Utilizing Pseudorandom Sequences," *IEEE Trans. Magn.*, Vol.30, pp. 4239–4241, November 1994) proposed a PRS method that relies on the assumption that the echoes are distant from the main dipulse and have the same shape. The validity of this assumption depends on write precompensation and PRS selection. In another example, Che et al. (Che et al., "Studies of Nonlinear Bit Shift and Partial Erasure Using Pseudo-Random Sequence," *IEEE Trans. Magn.*, Vol.29, pp. 3972–3974, November 1993) described a PRS method useful for estimating the separate contributions of NLTS and PE to recording channel nonlinearity by recognizing that the PE echo is separated by one-half bit cell from the NLTS echo when the PRS is carefully selected. As a further example, Mian (Mian, "An Algorithm for Real Time Measurement of Nonlinear Transition Shift by a Time Domain Correlation Analysis," *IEEE Trans. Magn.*, Vol.31, pp. 816–819, January 1995) described an improved PRS technique that overcomes many of the practical deficiencies of the original Palmer et al. method by incorporating time-domain auto-correlation analysis and carefully selecting the PRS.

Generally, the accuracy of the PRS method depends on the ratio of the isolated pulse width ($PW_{50}$) and the bit cell width (B). As $PW_{50}/B$ increases, PRS measurement accuracy increases, but the B/2 separation of NLTS and PE distortion echoes is soon swamped at the larger $PW_{50}$ values. Accordingly, accurate measurement of total channel nonlinearity using the PRS method in the time domain must be traded against the accurate separation of NLTS and PE effects. The dominant frequency-domain technique for measuring NLTS, herein denominated the Harmonic Elimination (HE) Method for measuring NLTS was first proposed by Tang et al. (Tang et al., "A Technique for Measuring Nonlinear Bit Shift," *IEEE Trans. Magn.*, Vol.27, pp. 5316–5318, November 1991). The HE method relies on special bit patterns that do not contain a particular frequency component when the pattern is written without NLTS. The presence of NLTS gives rise to the particular frequency component in proportion to the amount of NLTS when NLTS is small relative to bit cell length. For example, the fifth harmonic component may be employed to measure NLTS (the 5HE method). If there exists some other nonlinearities, such as PE and NTC, the fifth harmonic component amplitude depends on not only NLTS but also PE and NTC. The PE and NTC errors in NLTS measurements using the 5HE method are more severe for GMR heads at higher recording densities. Therefore, it is more important than ever to have an effective way to correct for the effects of PE and NTC on NLTS measurements when using the 5HE method. The 5HE method proposed by Tang et al. provides only the total nonlinear distortion of the recording process and cannot distinguish the contributions of NLTS, PE or, indeed, the NTC of the MR sensor The Fifth Harmonic Elimination (5HE) Measurement To assist in the appreciation of the later description of the method of this invention, an exemplary description of the fifth Harmonic Elimination (5HE) method from the above-cited Tang et al. reference is now presented. Reference is made to the Glossary of Mathematical Symbols presented herein below.

The NLTS data pattern is a playback waveform that has a period of NT, where T is the bit cell duration (write clock period) in seconds and N is the total number of bits in one period of the NLTS pattern. The NLTS pattern is designed to measure the proximity-induced transition shift in a pair of transitions (a dibit or dipulse) by creating the conditions under which a linear superposition of the dipulse components cancels completely at a selected harmonic of the fundamental frequency, $f=1/NT$ in Hz. Any deviation from zero signal at the selected harmonic frequency arises only from nonlinearities in the channel.

The general form of the NLTS pattern is:

1100 . . . (m0's)100 . . . (l0's)1100 . . . (m0's)100 . . . (l0's), where m=6M and l=6L, including the two 0's shown, and M, L are integers. The number of 0's in the pattern determines which harmonic represents the NLTS distortion (the NLTS harmonic number=2M+2N+1) and also determines the fundamental frequency of the NLTS measurement. According to the non-return-to-zero (NRZ) bit encoding convention, each '1' represents a magnetic transition, each '0' represents the absence of a flux transition, and each bit is separated by the write clock period, $T=B/v$, where B is the bit cell length and v is the linear velocity of the recording medium with respect to the writing gap of the head. For this example, the following overlapping 30-bit data patterns are defined:

The *NLTS* Pattern     110000001000000110000001000000

The Reference Pattern    000000001000000000000001000000

Bit cell duration in seconds=T
Pattern period=30T (N=30)
Bit cells in reference pattern=15T
This NLTS Pattern can be characterized as a sum of the following three reference patterns:

$Y_{D1}$:    100000000000000100000000000000

$Y_{D2}$:    010000000000000010000000000000

$Y_S$:     000000001000000000000001000000

In the time domain, these patterns can be expressed as:

$$Y(t)=P_{D1}(t)-P_{D2}(t-T+d)+P_S(t-8T) \qquad [\text{Eqn. 1}]$$

where,
Y(t)=the NLTS pattern in the time domain,
$Y_S$(t)=the Reference pattern in the time domain,
P(t)=an isolated pulse in the time domain, and
d=the NLTS shift in seconds.

Referring to FIG. 2, the NLTS pattern is illustrated as a flux transition sequence 36 and a readback sensor output waveform 38, both of which are aligned with the bit sequence described above. The pattern can be appreciated as a sequence of dipulses exemplified by the dipulse 40 and single isolated pulses exemplified by the single pulse 42.

Assuming no readback sensor saturation (no NTC effects) and no partial erasure (PE) effects, $$P_{D1}(t)=P_{D2}(t)=P_S(t) \qquad [\text{Eqn. 2}]$$

After Fourier transformation, the amplitude of the fifth harmonic ω of the NLTS Pattern is $$Y(\omega)=P(\omega)[1-e^{i\omega(T-d)}+e^{i\omega(8T)}] \qquad [\text{Eqn. 3}]$$

where k=5, $$F(\omega) = \frac{1}{\sqrt{2\pi}} \int F(t)e^{i\omega t}dt, \omega = \frac{2\pi k}{30T} = \frac{\pi}{3T},$$

and P(ω) is the amplitude of the fifth harmonic of the Reference Pattern. The ratio of the fifth harmonic amplitude of the NLTS pattern to the fifth harmonic amplitude of the reference pattern is then:

$$X(\omega) = \frac{Y(\omega)}{P(\omega)} \qquad [\text{Eqn. -4}]$$
$$= 1 - e^{i\pi(1-d/T)/3} + e^{i2\pi/3}$$
$$\cong \Delta e^{i5\pi/6}$$

So $|X(\omega)| = \left|\frac{Y(\omega)}{P(\omega)}\right| = \Delta$ where the fifth harmonic ratio, Δ=πd/3T and the desired NLTS in percent is equal to d/T=3Δ/π.

Note that the order O (Δ²) term is neglected in arriving at Eqn. 4. Another problem with Eqn. 4 is that other nonlinear recording phenomena, including partial erasure (PE) and the saturation or nonlinear transfer curve (NTC) characteristic of the read sensor, are ignored even when they may have a significant effect on the accuracy of these results.

Other practitioners have proposed various improvements and simplifications to the original 5HE method, which is still the most reliable and popular NLTS test in the art. For example, Che et al. (Che et al., "A Generalized Frequency Domain Nonlinearity Measurement Method," *IEEE Trans. Magn.*, Vol.30, pp. 4236–4238, November 1994) proposed a generalized version of the original 5HE method that eliminated many inconveniences, such as the recording density dependency and the run-length-limited (RLL) code constraints. Later, Che (Che, "Nonlinearity Measurements and Write Precompensation Studies for a PRML Recording Channel," *IEEE Trans. Magn.*, Vol.31, pp. 3021–3026, November 1995) proposed a new version of the HE method that allows the NLTS and PE effects to be separately measured by observing that a recorded square wave has no NLTS because the equally-spaced transitions are also equally shifted by the neighboring magnetostatic forces and remain equally separated by the bit cell width (B). Che proposed measuring the TBE/PE distortion alone in a square wave using a Third Harmonic Algorithm (3HA), measuring the combined TBE/PE and NLTS distortion using the generalized 5HE method, and computing the two separate TBE/PE and NLTS components. But like other practitioners, Che assumes that the odd-order components of the MR readback sensor NTC distortion can be ignored. As another example, Liu et al. (Liu et al, "Novel Method for Real-Time Monitoring of Non-Linear Transition Shift," *IEEE Trans. Magn.*, Vol.33, pp. 2698–2700, September 1997) proposed using a particular periodic bit pattern that combines dipulses and isolated pulses to measure NLTS and PE components of channel distortion in a single record and playback operation. Liu uses three adjacent odd harmonic components to extract NLTS from the total distortion, by adjusting the middle component according to a baseline extracted from the two side components, but is unable to measure the other distortion components. As yet another example, Cai (Cai, "New Frequency-Domain Technique for Joint Measurement of Nonlinear Transition Shift and Partial Erasure," *IEEE Trans. Magn.*, Vol.35, pp. 4535–4537, November 1999) proposed using three specially-constructed periodic bit patterns in the HE method to simultaneously measure the NLTS and PE components of channel distortion. Cai specifically cautions that his method assumes that the odd-order components of the MR readback sensor NTC distortion can be ignored.

The 3HA method proposed by Che improves on the 5HE method of Tang et al. by accounting for the effects of PE on NLTS but he corrects for the amplitude reduction effects alone and does not consider the effects of pulse shape distortion. This method is now discussed in detail.

The Third Harmonic Algorithm (3HA) for Partial Erasure (PE) Measurement

To assist in the appreciation of the later description of the method of this invention, an exemplary description of the frequency-domain NLTS measurement method from the above-cited November 1995 reference by Che is now presented. Che's NLTS measurement improvement includes a method for removing the effects of PE on the original 5HE NLTS measurements.

Step A: Define a Correction Factor as PE Factor Alpha (α)

A unitless partial erasure (PE) correction factor α is defined by:

$$P_D(t)=(1-\alpha(T))P^0{}_D(t), \qquad [\text{Eqn. 5}]$$

where T is the bit cell duration in seconds, PE factor α is a function of T, $P_D(t)$ is the time-domain signal of a single pulse in the dipulse exhibiting partial erasure (PE) and $P^0{}_D(t)$ is the time-domain signal of an ideal single pulse in the dipulse without PE. Because α(T) is assumed to be independent of the fifth-harmonic frequency ω of the NLTS bit pattern, Fourier transformation yields:

$$P_D(\omega)=(1-\alpha(T))P_0(\omega)). \qquad [\text{Eqn. 6}]$$

Step B: Measure the PE Factor Alpha with the Third Harmonic Algorithm (3HA)

The 3HA method proposed by Che for measuring PE factor α exploits intersymbol interference in a square wave and maybe appreciated by considering that, for a square wave, the magnetostatic interaction between adjacent transitions causes each transition to shift toward the previous one, so that the entire square wave is merely shifted equally by the NLTS amount. Therefore, NLTS cannot be observed in a square wave and the only waveform distortions that can be observed upon playback (other than read sensor distortion, if any) are the combination of PE and transition broadening effect (TBE). For a square wave signal, $$V(x) = \sum_{n=-\infty}^{+\infty} (-1)^n V_{sp}(x-nB),$$

where, $V_{sp}$ is the single transition signal, B is the bit cell length and n is the transition number. After Fourier transformation, $$V(k) = V_{sp}(k)\sum_{n} e^{-in(kB-\pi)}, \quad [\text{Eqn. 7}]$$

where k is the wave number such that $k=\omega/v=2\pi f/v$, where v is linear velocity. Using the $\delta$ function, $$V(k) = 2k_0 V_{sp}(k)\sum_{n} \delta(k-(2m+1)k_0), \quad [\text{Eqn. 8}]$$

where $k_0=\pi/B$, because $$\sum_{n=-\infty}^{+\infty} e^{-i2\pi nx} = \sum_{n=-\infty}^{+\infty} \delta(x-m).$$

Therefore, $$V(f,2n+1) \propto k_f V_{sp}((2n+1)f) \quad [\text{Eqn. 9}]$$

where $V(f, 2n+1)$ is the amplitude of the $(2n+1)^{th}$ harmonic, $f$ is the fundamental frequency and $k_f$ is the wave number corresponding to $f$.

According to Eqn. 9, for two square waves, one recorded at $f$ and the other recorded at $3f$, the fundamental harmonic component of the $3f$ signal has three times the amplitude of the third harmonic component of the $f$ signal (by simple Fourier decomposition of a perfect square wave). This is so only when there is no waveform distortion present (no PE or TBE). FIG. 3 illustrates these two square waves as the flux transition sequence 44 recorded at $f$ and the flux transition sequence 46 recorded at $3f$ along with the equivalent bit patterns.

For n=1, $$PE = \frac{V(3f,1)}{3V(f,3)} = \frac{k_{3f}}{3k_f} = 1. \quad [\text{Eqn. 10}]$$

As recording density increases (as $f$ increases), PE distortion will first appear in the recorded $3f$ signal. If PE exists in the recorded $3f$ signal, numerator $V(3f, 1)$ is reduced while denominator $V(f, 3)$ remains representative of the transform of the ideal isolated pulse $P_0(t)$ at $f$. Then, PE is less than unity and, according to Eqn. 6:

$$PE=1-2\alpha(T) \quad [\text{Eqn. 11}]$$

where the factor of 2 accounts for the loss of amplitude from each of two adjacent transitions.

Measuring the ratio of the fundamental harmonic of the $3f$ signal to the third harmonic of the $f$ signal yields PE, from which Eqn. 11 yields an experimental value for $\alpha$. Note that the PE value thus obtained relates to the PE distortion present at higher frequency, $3f$ and not the lower frequency, $f$.

Step C: Derive a New NLTS Formula, Replacing Eqn. 4, to Calculate $\Delta$ from X and $\alpha$.

An expression for NLTS may be derived from these results. Substituting Eqn. 6 into Eqn 4 yields:

$$X(\omega)=(1-\alpha)-(1-\alpha)e^{-i\Delta}\cdot e^{i\pi/3}+e^{i2\pi/3}. \quad [\text{Eqn. 12}]$$

If $(1-\alpha)\Delta \approx \Delta$, $$X(\omega) = -\left(\frac{\sqrt{3}}{2}\Delta + \frac{1}{2}\alpha\right) + i\left(\frac{1}{2}\Delta + \frac{\sqrt{3}}{2}\alpha\right) \quad [\text{Eqn. 13}]$$

$$|X(\omega)|^2 = \Delta^2 + \sqrt{3}\,\alpha\Delta + \alpha^2$$

$$\Delta^2 + \sqrt{3}\,\alpha\Delta + (\alpha^2 - X^2) = 0 \quad [\text{Eqn. 14}]$$

Then, $$\Delta = -\frac{\sqrt{3}}{2}\alpha + \frac{1}{2}\sqrt{4X^2 - \alpha^2} \quad [\text{Eqn. 15}]$$

After the fifth harmonic amplitude ratio X (see Eqn. 4) and the PE correction $\alpha$ (see Eqn. 11) are obtained experimentally, NLTS (in percent)=$d/T=3\Delta/\pi$ is calculated from Eqn. 15.

This completes the description of Che's improved NLTS measurement method incorporating the 3HA method for PE measurement, which has been used successfully in the art to characterize NLTS in inductive and magnetoresistive (MR) heads. However, when applied to the GMR head at higher recording densities, the following three problems with this method become serious.

Problems with Existing NLTS Measurement Methods

Pulse Shape Distortion: Referring to Eqn. 5, note that PE amplitude reductions alone are considered and pulse distortion effects are ignored. Nonlinearity recording phenomena, including PE and sensor NTC effects, tend to distort the shape of pulses as well as reduce amplitude. The pulse shape distortion effect is greater than the amplitude reduction effect. In the frequency domain, this effect makes the PE factor $\alpha$ dependent on the fifth harmonic of the NLTS pattern frequency as well as the bit cell duration T where PE occurs. The neglect of this frequency dependence in Eqn. 6 gives rise to large errors in the PE factor $\alpha$. In particular, using a GMR sensor at higher recording densities causes larger values of $\alpha^2$ to be measured experimentally, such that $\alpha^2 > 2X^2$. Under such conditions, Eqn. 15 has no solution.

GMR Saturation: As seen in FIG. 5, the nonlinearity of the GMR sensor transfer curve is usually much greater than the similar transfer curve for earlier MR sensors. FIG. 5 shows the measured GMR nonlinear transfer curve (NTC) for an exemplary 50 nm merged-head design for several values of GMR sensor bias current. The NTC 48 measured at 3 mA is more linear than the NTC 50 measured at 6 mA, but less output amplitude is available from NTC 48. The severely nonlinear GMR NTC affects the results of the 3HA measurement, as can be appreciated from FIG. 6, which shows the NLTS measured by the inventors in accordance with the prior art method of Eqn. 15 as a function of GMR bias current. It may be readily appreciated from the data in FIG. 6 that the increased NTC distortion at higher bias currents is erroneously measured by the method of Eqn. 15 as increased NLTS and the error is nearly 30%. Consequently, the denominator, $V(f, 3)$, of Eqn. 10 can no longer be accurately characterized as the third harmonic of an ideal isolated pulse. Accordingly, the correct value of PE factor $\alpha$ cannot be directly obtained from the simple 3HA measurement, even though the frequency dependency of PE factor $\alpha$ has been properly considered.

Second Order Effects: The expression in Eqn. 14 is only a first approximation and ignores second-order terms. For GMR head technology, the inventors have found Eqn. 14 to be insufficient for obtaining a reasonable PE factor $\alpha$. The solution, Eqn. 15 actually overcorrects the NLTS value to the point of uselessness, as demonstrated by the data of FIG. 6.

The purpose of making accurate NLTS measurements is to provide a guide for setting write precompensation parameters. The final tuning of write precompensation parameters should be accomplished using bit error rate (BER) measurements in a real partial-response maximum-likelihood (PRML) channel but the NLTS measurements provide an important and useful first approximation for PRML channel write precompensation parameters for the designer.

Accordingly, there is a clearly-felt need in the art for a reliable and accurate NLTS measurement technique that can distinguish between NLTS and TBE/PE distortion while accommodating the substantial harmonic components (both odd and even) of the NTC distortion and bit densities encountered with GMR sensor technology, which can no longer be ignored. Accurate NLTS measurements are need to permit precompensation during writing. Accurate TBE/PE measurements are required to certify the proposed data recording density for the medium and head under test. Accurate GMR NTC saturation measurements are need to permit postcompensation during reading. Moreover, these nonlinearities also affect other standard quality control (QC) measurements, such as pulse width ($PW_{50}$), signal-to-noise ratio (SNR), track average amplitude (TAA) and resolution, through interactions that may produce abnormal correlation among several testing parameters, such as $PW_{50}$ with resolution or NLTS, NLTS with TAA, NLTS with SNR, and the like. These unresolved problems and deficiencies are clearly felt in the art and are solved by this invention in the manner described below.

SUMMARY OF THE INVENTION

This invention solves the above-described problems by introducing a new nonlinear transition shift (NLTS) measurement procedure for read/write heads employing a giant magnetoresistive (GMR) read sensor. The method of this invention arises from an unexpectedly advantageous observation that the effects of pulse-shape distortion and second-order effects from GMR nonlinear transfer characteristic (NTC), transition broadening and partial erasure (TBE/PE), may be incorporated in the NLTS measurement procedure to permit accurate isolation of the NLTS from the unrelated TBE/PE and GMR reader NTC.

It is an advantage and feature of the method of this invention that the accuracy of the NLTS measurements do not depend on TBE/PE levels nor on the NTC of the readback sensor.

It is another advantage and feature of the method of this invention that a new parameter, Beta, is obtained from the NLTS measurements for use in determining for the head under test the amount of any TBE/PE or NTC.

It is yet another advantage and feature of the method of this invention that after correcting for the effects of the measured nonlinearities, the remaining magnetic parameter measurements are again normally correlated, permitting effective characterization of magnetic head performance for quality control (QC) purposes.

In one aspect, the invention is a method for characterizing the non-linear transition shift (NLTS) of two adjacent magnetic flux transitions created in a magnetic storage medium at a clock rate of 1/T by a write head and reproduced from the magnetic storage medium by a read head, the method including the steps of performing a fifth harmonic elimination (5HE) test using a NLTS pattern having a bit period T to measure a first transition signal nonlinearity value X, performing a partial erasure (PE) test using a first square wave signal having a second bit period $T_m>T$ and a second square wave signal having a third bit period $5T_m$ to measure a second transition signal nonlinearity value $X_S$, performing a PE test using a third square wave signal having the bit period T and a fourth square wave signal having a fourth bit period 5T to measure a third transition signal nonlinearity value $X_h$, and computing the NLTS by combining the first, second and third transition signal nonlinearity values.

Although the existing partial erasure measurement is used in this invention, the way the measurements are interpreted and incorporated into correcting NLTS is unique to this invention because of the introduction of the effect of pulse-shape distortion due to recording nonlinearity.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DESCRIPTION OF THE PREFERRED EMBODIMENT

Figure 1:
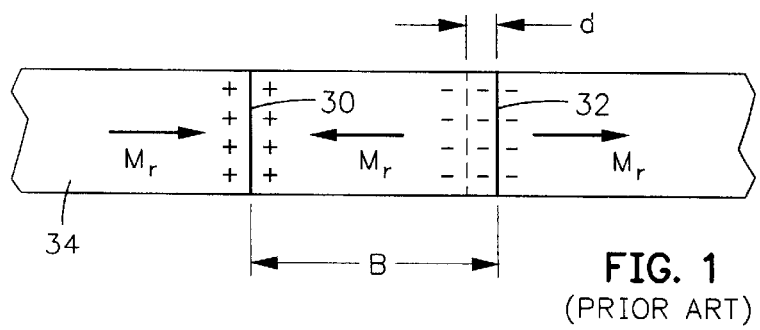
FIG. 1 is a schematic diagram illustrating a pair of magnetic flux transitions in a magnetic recording medium, herein denominated a dibit, from the prior art.
Figure 2:
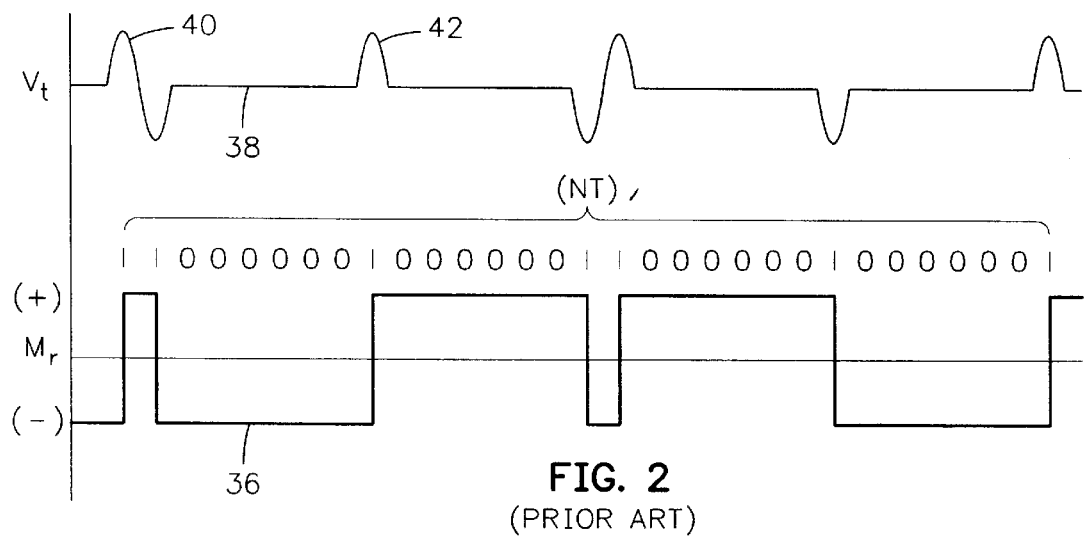
FIG. 2 is a diagram illustrating the nonlinear transition shift (NLTS) pattern from the prior art according to Eqn. 1 for monitoring NLTS distortion at the fifth harmonic of the fundamental pattern frequency.

To add clarity, the definitions of the mathematical symbols used in the following description are collected and presented here in alphabetical order as follows.
Glossary of Mathematical Symbols $\alpha=\alpha(T)$=the PE correction factor from the prior art
$\beta=\beta(T, \omega)$=the aggregate PE/TBE and GMR NTC correction factor of this invention
$\beta_P(T, \omega)$=the PE/TBE correction factor of this invention
$\beta_S(\omega)$=the GMR NTC saturation correction factor of this invention
$\gamma$=substitute variable (Eqn. 39)
$\delta$=incremental half pulse width increase from a peak amplitude reduction
$\Delta$=the fifth harmonic ratio from the 5HE test representing only NLTS distortion
$\delta(x)$=the Delta Function
$\delta_P$=incremental pulse signal amplitude reduction from PE/TBE saturation
$\delta_S$=incremental pulse signal amplitude reduction from GMR NTC saturation
$v$=Recording medium velocity in meters/second
$\omega=2\pi f=\pi/T_\omega$=frequency in radians/second
$\omega=\pi/3T$=the fifth harmonic frequency of the NLTS pattern in radians/second
B=Bit cell length in meters=Tv
d=the NLTS shift in seconds
D=1/B=transition density in flux transitions per meter of the 5HE test of this invention
$D_h$=transition density in flux transitions per meter of the high density PE test of this invention
$D_m$=transition density in flux transitions per meter of the lower density PE test of this invention
$f$=the fundamental frequency in Hertz
$F_1$=a factor of Eqn. 27
$F_2$=a factor of Eqn. 27
$k=\omega/v=2\pi f/v$=the wave number
$k_0=\pi/B$
$k_f$=the wave number corresponding to $f$
l=6L is an integer
L=a positive integer
m=6M is an integer
M=a positive integer
N=the total number of bits in one period of the NLTS pattern
n=the square wave transition number (an integer)
NLTS pattern=$Y_{D1}+Y_{D2}$=11000000100000011000000100000
NLTS=NLTS in percent=$d/T=300\Delta/\pi$
$P(\omega)$=the amplitude of the k harmonic of the Reference Pattern
$P(t)=P_0(t)=P^0{}_D(t)$=the signal level of an ideal pulse in the time domain
$P_0^{-1}(V)$=an inverse function of $P_0(t)$
$P^0{}_D(\omega)=P_0(\omega)$=the amplitude of the k harmonic of a single ideal pulse
$P^0{}_D(t)$=the signal level of a single pulse in the dipulse without PE./TBE in the time domain
$P_D(t)$=the signal level of a single pulse in a dipulse exhibiting PE/TBE in the time domain
$P_D\omega$=the amplitude of the k harmonic of a single pulse in a dipulse exhibiting PE/TBE
$PE_h$=the fifth harmonic ratio measured for the high density 5HA square wave test of this invention
$PE_m$=the fifth harmonic ratio measured for the low density 5HA square wave test of this invention
$P_S(\omega)$=the amplitude of the k harmonic of a single pulse exhibiting GMR NTC saturation
$PW_{50}$=the pulse width at 50% threshold in seconds
$R_{NLTS}=P_D(\omega)/P_S(\omega)$=NLTS to reference pattern ratio at the fifth harmonic frequency
t=time in seconds
T=bit cell duration (write clock period) in seconds
$T_m$=bit cell duration in seconds for the lower density PE test of this invention
$T_\omega$=bit cell duration (write clock period) in seconds for $\omega$ fundamental frequency
$V=P_0(t)$=the signal level of an ideal pulse in the time domain
$V(f, 2n+1)$=the amplitude of the $(2n+1)^{th}$ harmonic of frequency $f$ of square wave
$V(k)$=the amplitude of the $k^{th}$ wave number of square wave
$V_0$=the pulse signal peak amplitude
$V_{sp}$=the signal level of a single square wave transition in the time domain
x=distance in meters
$X(\omega)=Y(\omega)/P(\omega)$
$X_M$=imaginary part of $X(\omega)$
$X_P(\omega)$=the PE/TBE distortion ratio at the fifth NLTS pattern harmonic (Eqns. 32)
$X_R$=real part of $X(\omega)$ $X_S(\omega)$=the GMR NTC distortion ratio at the fifth NLTS pattern harmonic (Eqns. 32)

$Y(\omega)$=the amplitude of the k harmonic of the NLTS pattern $Y(t)$=the NLTS pattern in the time domain $Y_{D1}$=10000000000000100000000000000

$Y_{D2}$=01000000000000010000000000000

$Y_S$=00000000100000000000001000000 (the 5HE reference pattern)

$Y_S(t)$=the reference pattern in the time domain

Introduction

The fifth Harmonic Elimination (5HE) method was, until now, the most reliable and efficient test for measuring the nonlinear transition shift (NLTS) for a particular read/write head. However, for the reasons described above, the 5HE measurement results are known to be significantly affected by other recording channel nonlinearity phenomena. The evaluation of new head design and the introduction of giant magnetoresistive (GMR) read sensors into the production line is not feasible without reducing the effects of these other nonlinearities on NLTS testing results.

The inventors have developed a new theory and testing procedure to achieve this purpose, which is now described.

The New NLTS Measurement Theory of this Invention

To assist in the appreciation of the later description of the method of this invention, the theoretical basis of new NLTS measurement method of this invention is now described. This description includes the following improvements:

Improvement 1: Define the new correction factors, Beta, for PE and for NTC (GMR saturation, for example);

Improvement 2: Assume a Lorentz function shape for the isolated pulse; and

Improvement 3: Derive a new NLTS formula, including second-order terms, to calculate $\Delta$ from X and Beta, replacing Eqn. 15.

Improvement 1, New Correction Factors: Two new unitless correction factors, $\beta_P$ and $\beta_s$ are defined as functions of the fifth harmonic frequency $\omega$ (in radians/second) of the NLTS bit pattern and bit cell duration T (in seconds):

$$P_D(\omega)=(1-\beta_p(T,\omega))P_0(\omega)$$

$$P_S(\omega)=(1-\beta_s(\omega))P_0(\omega) \qquad [\text{Eqns. 16}]$$

where $\beta_P$ is the new PE factor and $\beta_s$ is the new GMR NTC saturation factor, $P_D(\omega)$ is the frequency-domain signal level of a single pulse in the dipulse exhibiting TBE/PE, $P_S(\omega)$ is the frequency-domain signal level of a single pulse exhibiting GMR sensor with NTC and $P_0(\omega)$ is the frequency-domain signal level of an ideal single pulse without PE. Combining Eqns. 16 yields:

$$1-\beta(T,\omega) = \frac{P_D(\omega)}{P_S(\omega)} = \frac{1-\beta_p(T,\omega)}{1-\beta_s(\omega)} \qquad [\text{Eqn. 17}]$$

where $\beta(T,\omega)$ is an aggregate correction factor for the aggregate TBE/PE and NTC distortion.

Improvement 2, Pulse Shape Effects: According to the method of this invention, the isolated pulse shape is assumed to approximate a Lorentz function. With this assumption, the inventors have derived new expressions for measuring and computing the above-described Beta factors according to the following reasoning.

An ideal isolated pulse in the time domain may be expressed as:

$$V = P_0(t) = \frac{V_0}{1+\left(\frac{t}{PW_{50}/2}\right)^2} \qquad [\text{Eqn. 18}]$$

$$P_0(\omega) = \sqrt{\frac{\pi}{2}} \cdot V_0 \frac{PW_{50}}{2} e^{-PW_{50}\omega/2} \qquad [\text{Eqn. 19}]$$

where $PW_{50}$ is the half pulse width (in seconds) and $\omega=2\pi f = \pi/T_\omega$ If a nonlinearity introduces amplitude reduction and shape distortion, both $V_0$ and $PW_{50}$ are affected. Consider the particular case of the GMR NTC nonlinearity alone as a simple example. Assume that GMR saturation reduces the pulse signal amplitude $V_0$ by some amount $\delta_S$ from $V_0$ to $(1-\delta_S)V_0$ and changes the pulse shape so that the pulse width at 50% threshold $PW_{50}$ is increased by some amount $\delta$ from $PW_{50}$ to $(1+\delta)PW_{50}$. Assuming that the pulse shape is still well-approximated by a Lorentz function after saturation, the signal level of a pulse $P_S$ with GMR sensor distortion $\delta_S$ may be expressed as:

$$V_S = P_S(t) = \frac{(1-\delta_S)V_0}{1+\left(\frac{t}{PW_{50}(1+\delta)/2}\right)^2} \qquad [\text{Eqn. 20}]$$

$$P_S(\omega)=(1-\delta_S)(1+\delta)e^{-PW_{50}\delta\omega/2}P_0(\omega) \qquad [\text{Eqn. 21}]$$

Because only the upper part of the isolated pulse is significantly affected by the assumed GMR saturation, the following approximation may be made:

$$PW_{50}(1+\delta)/2 = P_0^{-1}\left(\frac{1}{2}(1-\delta_S)V_0\right), \text{ or} \qquad [\text{Eqn. 22}]$$

$$P_0(t = PW_{50}(1+\delta)/2) = \frac{1}{2}(1-\delta_S)P_0(t=0)$$

where $P_0^{-1}(V)$ is an inverse function of $P_0(t)$. Then $$\delta = \sqrt{\frac{1+\delta_S}{1-\delta_S}} - 1 \approx \delta_S + \frac{\delta_S^2}{2}. \qquad [\text{Eqn. 23}]$$

Assuming a small value for $\delta_S$, the $O(\delta_S^3)$ term may be discarded. Substituting Eqn. 23 into Eqn. 21 yields:

$$P_S(\omega) = (1-(\delta_S^2/2))e^{-PW_{50}\delta_S\omega/2}P_0(\omega) \qquad [\text{Eqn. 24}]$$

Similarly, assume that PE distortion reduces the amplitude $V_0$ by some amount $\delta_P$ from $V_0$ to $(1-\delta_P)V_0$ and changes the pulse shape so that the pulse width at 50% of full amplitude, $PW_{50}$, is increased by some amount $\delta$ from $PW_{50}$ to $(1+\delta)PW_{50}$. For example, using the above reasoning, one pulse $P_D$ of the dipulse in the NLTS pattern with PE distortion $\delta_P$ may be expressed as:

$$P_D(\omega) = (1-(\delta_P^2/2))e^{-PW_{50}\delta_P\omega/2}P_0(\omega) \qquad [\text{Eqn. 25}]$$

Pulse Shape Effects on the New Beta Correction Factors: From Eqns. 16, 24 and 25, the two new Beta correction factors may be expressed as:

$$1 - \beta_S(\omega) = (1 - (\delta_S^2/2))e^{-PW_{50}\delta_S\omega/2} \qquad [\text{Eqn. 26}]$$

$$1 - \beta_P(T, \omega) = (1 - (\delta_P^2(T)/2))e^{-PW_{50}\delta_P\omega/2} \qquad [\text{Eqn. 27}]$$

where $\omega$ is frequency, $\beta_P$ is the new PE factor, $\beta_s$ is the new GMR saturation (NTC) factor, $PW_{50}$ is the pulse width at 50% of full amplitude, $\delta_P$ is the PE distortion, $\delta_S$ is the GMR NTC saturation distortion and T is the bit cell period in seconds. For high frequencies, $\omega=\pi/T$, and, for the fifth harmonic of the NLTS pattern, $\omega=\pi/3T$. Because of the PE effect, $\delta_P$ is a function of the bit cell duration T of the dipulse. But $\delta_S$ is not a function of either T or $\omega$ because it is arises from the nonlinear transfer characteristic (NTC) of the GMR readback sensor.

The right-hand side of Eqn. 27 has two factors, which may be written:

$$F_1 = (1 - \delta_p)(1 - \delta) \approx 1 - \delta_p^2(T)/2 \qquad [\text{Eqns. 28}]$$

$$F_2 = e^{-PW_{50}\delta\omega/2} \approx e^{-PW_{50}\delta_p\omega/2}$$

The first factor of $F_1$ also has two factors. The first of these is the amplitude reduction in the time domain from PE and the second factor of $F_1$ is the change in $PW_{50}$ in percent. The terms of the order $O(\delta_p)$ cancel one other to leave a small term of order $O(\delta_p^2)$. $F_2$ is a result of the change in $PW_{50}$ only, the effect of which is much larger than the combined effects of $F_1$. For example, if $\delta_p=0.1$, then $\delta \approx 0.11$ and $F_1=0.995$. On the other hand, experimental measurements at high frequency for an exemplary 50 nm merged GMR head show that $PW_{50}/T \approx 2.3$ (in the OD zone) for which $F_2=0.697$. These same measurements show that $F_2=0.887$ at the fifth harmonic frequency of the NLTS pattern. This means that the second factor $F_2$ dominates the new correction factor $\beta_P$, which is clearly a function of frequency $\omega$. This dominant effect of the second factor $F_2$ was until now unappreciated in the art because it arises only from the effects of PE and NLTS on pulse shape. If the nonlinearity effects on pulse width $PW_{50}$ are ignored, Eqn. 27 reverts to Eqn. 6. Similarly, the same discussion also applies to Eqn.26 for the NTC situation.

The aggregate Beta correction factor may now be expressed as:

$$1 - \beta(T, \omega) = \frac{P_D(\omega)}{P_S(\omega)} = \frac{1 - \delta_p^2(T)}{1 - \delta_S^2} e^{-\frac{\pi}{2}(\delta_P-\delta_S)PW_{50}\omega} \qquad [\text{Eqn. 29}]$$

For the fifth harmonic of the NLTS pattern, $$R_{NLTS} = \frac{P_D(\omega)}{P_S(\omega)} = 1 - \beta(T, (\pi/3T)) \qquad [\text{Eqn. 30}]$$

$$= \frac{1 - \delta_p^2(T)}{1 - \delta_S^2} e^{-\frac{\pi}{2}(\delta_P-\delta_S)PW_{50}/3T}$$

$$\cong e^{-\frac{\pi}{2}(\delta_P-\delta_S)PW_{50}/3T} \qquad [\text{Eqn. 31}]$$

where the terms of order $O(\delta^2)$ are ignored in Eqn. 31.

For convenience to further calculation, define $X_S$ and $X_P$ as follows:

$$X_S \equiv e^{\frac{\pi}{2}PW_{50}\delta_S/3T}, \qquad [\text{Eqns. 32}]$$

$$X_P \equiv e^{\frac{\pi}{2}PW_{50}\delta_P/3T}.$$

Then, from Eqn. 31, $$R_{NLTS} = 1 - \beta(T, \omega) = \frac{X_S}{X_P}. \qquad [\text{Eqn. 33}]$$

Improvement 3, New NLTS Expression with Higher-Order Terms: Including higher-order terms, obtain a new formula for NLTS distortion, X, such that:

$$X=X(\Delta, \beta(T, \omega)) \qquad [\text{Eqn. 34}]$$

For the NLTS bit pattern with dipulse transitions $P_D$ and singleton transitions $P_S$, with NLTS nonlinearity d, Eqn. 3 becomes $$Y(\omega)=P_D(\omega)-P_D(\omega)e^{i\omega(T-d)}+P_S(\omega)e^{i\omega(8T)} \qquad [\text{Eqn. 35}]$$

Replacing the correction factor $\alpha$ in Eqn. 12 with the new correction factor $\beta$ yields:

$$X(\omega)=(1-\beta)-(1-\beta)e^{-i\Delta}\cdot e^{i\pi/3}+e^{i2\pi/3} \qquad [\text{Eqn. 36}]$$

Using simple complex algebra calculations similar to the above while including higher-order $\beta$ and $\Delta$ terms provides a new more accurate expression for NLTS distortion as follows:

$$X(\omega) = X_R + iX_M \qquad [\text{Eqn. 37}]$$

$$X_R = -\frac{1}{2} + (1-\beta) - (1-\beta)\left(\frac{1}{2}\cos\Delta + \frac{\sqrt{3}}{2}\sin\Delta\right)$$

$$X_M = \frac{\sqrt{3}}{2} - (1-\beta)\left(\frac{\sqrt{3}}{2}\cos\Delta - \frac{1}{2}\sin\Delta\right)$$

$$X^2 = (1-\beta)\left(1 - \frac{1}{2}\beta\right)\Delta^2 + \sqrt{3}\beta(1-\beta)\Delta + \beta^2 \qquad [\text{Eqn. 38}]$$

$$\Delta = \frac{\left[-\frac{\sqrt{3}}{2}\beta + \frac{1}{2}\sqrt{4\gamma X^2 - (4\gamma - 3)\beta^2}\right]}{1 - \frac{\beta}{2}} \qquad [\text{Eqn. 39}]$$

where $$\gamma = \left(1 - \frac{\beta}{2}\right)/(1-\beta).$$

Upon measuring the values of X and $\beta$ experimentally, $\Delta$ may be computed using Eqn. 39 and NLTS in % then computed as $d/T=3\Delta/\pi$.

The New Frequency Domain NLTS Measurement Method of this Invention

Figure 7:
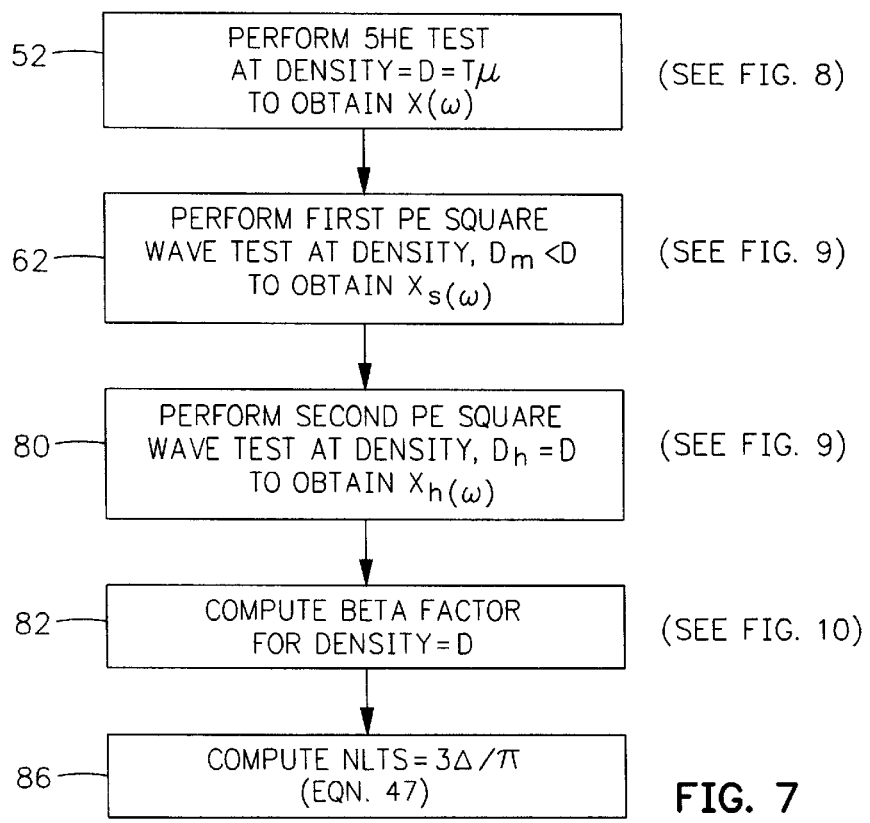
FIG. 7 is a block diagram of a flowchart illustrating the NLTS measurement method of this invention.

Based on the above theoretical description, the inventors have developed the following testing procedure for measuring NLTS in percent that provides results that are unaffected by the PE or GMR NTC. This method is schematically shown in FIG. 7.

Step One: A seen in the step 52 (FIG. 7), let T=1/$f$ be the bit cell period at the magnetic transition density D for which the NLTS measurement is desired. Using the NLTS Pattern and the Reference Pattern from the above discussion in connection with Eqn. 1, perform the original 5HE test described above in connection with Eqns 1–4 and obtain a value for the fifth harmonic ratio, $X(\omega)$, where $\omega=\pi/3T$.

Figure 8:
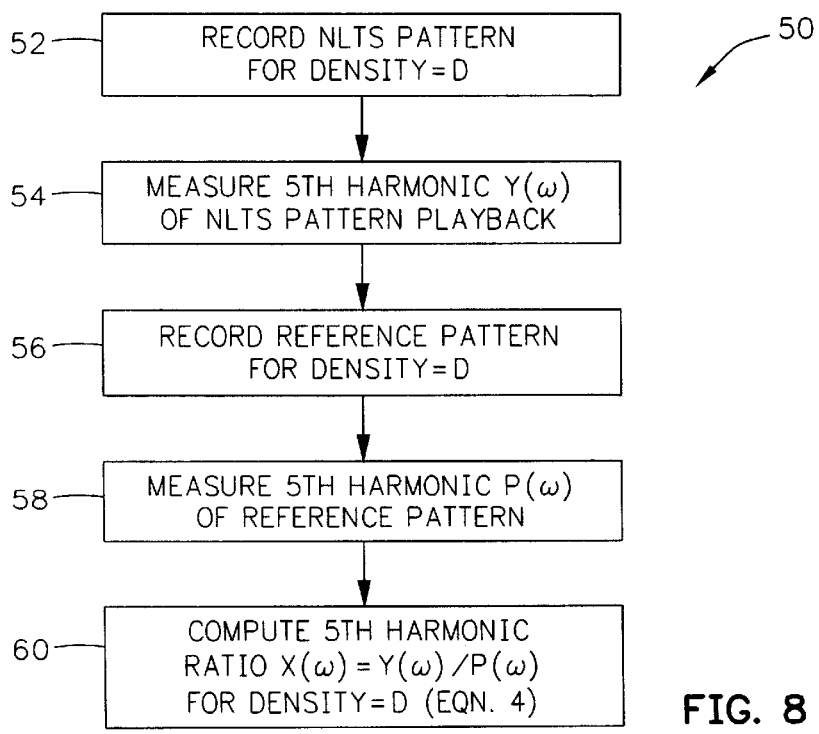
FIG. 8 is a block diagram of a flowchart illustrating the fifth harmonic elimination (5HE) measurement method of this invention for total nonlinearity from FIG. 7.

Step 50 is shown in more detail in FIG. 8. The NLTS pattern discussed above in connection with Eqn. 1 is recorded using the head and density under test in the first step 52. In the next step 54, the recorded NLTS pattern is read back with the head under test and the fifth harmonic of the playback signal is measured to produce a value for $Y(\omega)$ (see Eqn. 3). In the next step 56, the reference pattern discussed above is recorded using the head and density under test. In step 58, the recorded reference pattern is read back with the head under test and the fifth harmonic of the playback signal is measured to produce a value for $P(\omega)$, which ideally is zero because of the pulse spacing in the reference pattern. Finally, in the step 60, the ratio $X(\omega)$ is computed according to Eqn. 4. This is not the desired NLTS result, however.

Figure 3:
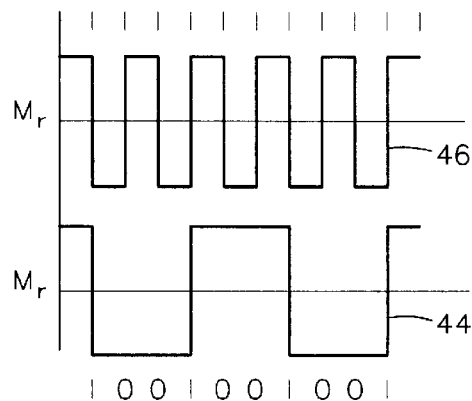
FIG. 3 is a diagram illustrating two square wave patterns from the prior art according to Eqn. 9 for monitoring waveform distortion exclusive of NLTS at the third harmonic of the fundamental pattern frequency.
Figure 4:
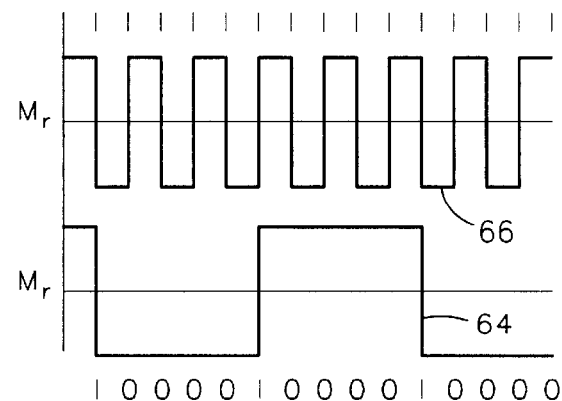
FIG. 4 is a diagram illustrating the two square wave patterns for monitoring waveformdistortion exclusive of NLTS at the fifth harmonic of the fundamental pattern frequency in accordance with the method of this invention.
Figure 5:
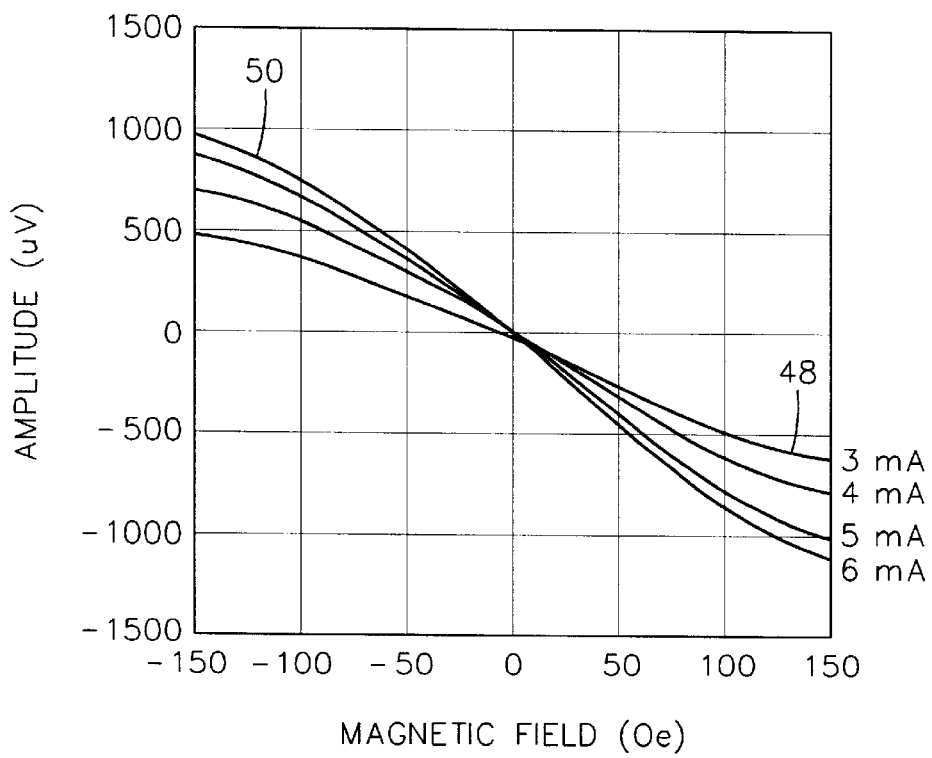
FIG. 5 is a chart displaying the GMR nonlinear transfer curve (NTC) versus the giant magnetoresistive (GMR) sensor bias current as measured by the inventors for an exemplary 50 nm merged-head design.
Figure 6:
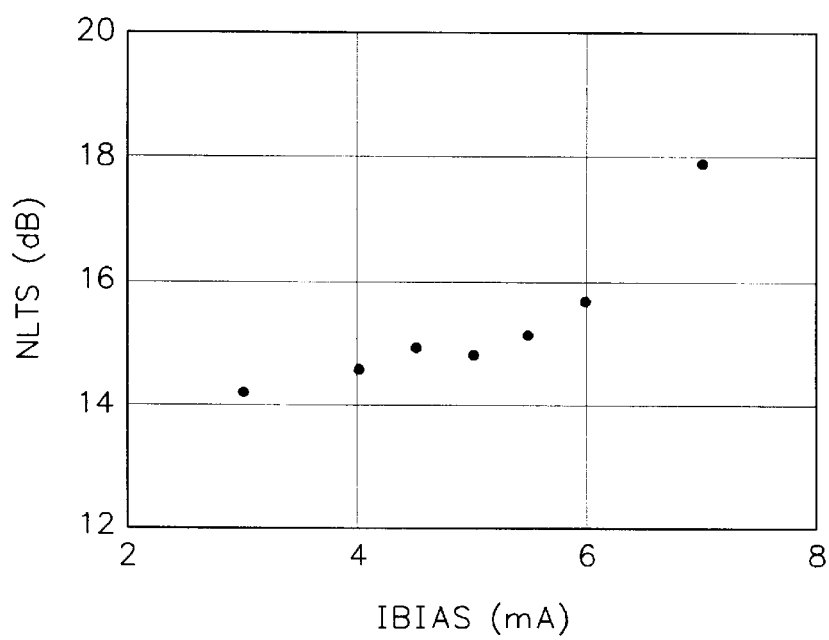
FIG. 6 is a chart displaying NLTS versus GMR sensor bias current as measured by the inventors using the prior art method of Eqn. 15 for an exemplary 50 nm merged-head design.

Step Two: As seen in the next step 62 of FIG. 7, a flux change density $D_m$ is selected to be is as high as possible without exceeding the transition density threshold for the onset of PE. Let $T_m=1/f_m<T$ be the bit cell period at this density $D_m$. Perform the harmonic algorithm (HA) PE test using two square wave patterns of single transitions similarly to those as described above in connection with Eqns. 5–15 and FIG. 3 to obtain a first partial erasure value $PE_m$ as defined by Eqn. 10. However, in the method of this invention, the square waves shown in FIG. 4 are used instead so the fifth harmonic can be measured instead of the third harmonic to more closely match the phase distortion encountered in the 5HE measurements of step 52. FIG. 4 illustrates these two square waves as the flux transition sequence 64 recorded at $f$ and the flux transition sequence 66 recorded at $5f$ along with the equivalent bit patterns.

Figure 9:
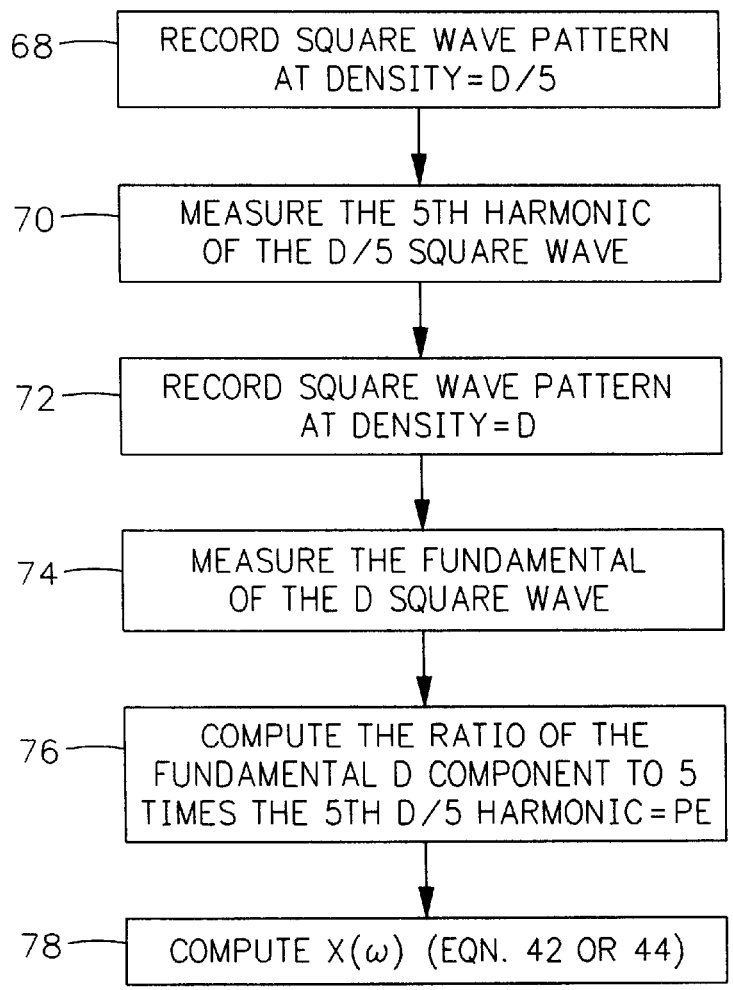
FIG. 9 is a block diagram of a flowchart illustrating the fifth harmonic algorithm (5HA) measurement method of this invention for partial erasure (PE) from FIG. 7.

The fifth harmonic algorithm (5HA) test of this invention is shown in more detail in FIG. 9. In the first step 68, square wave pattern 64 (FIG. 4) is recorded at a write clock period $T_m$ using the head under test. In the next step 70, the recorded square wave pattern 64 is read back with the head under test and the fifth harmonic of the playback signal is measured the produce a value for $V(f_{sq}, 5)$ (see Eqn. 40). In the next step 72, the square wave pattern 66 (FIG. 4) is recorded at a write clock period $T_m$ using the head under test. In step 74, the recorded square wave pattern 66 is read back with the head under test and the fundamental frequency of the playback signal is measured to produce a value for $V(5f_{sq}, 1)$. In the next step 76, recognizing that the square wave 64 frequency $f_{sq}=f_m/5$, a value for $PE_m$ is computed from Eqn. 40:

$$PE_m = \frac{V(5f_{sq}, 1)}{5V(f_{sq}, 5)} \qquad [\text{Eqn. 40}]$$

From Eqns. 40 and 26, $$PE_m = e^{\frac{\pi}{2}PW_{50}\delta_S/T_m} = \exp\left\{\left(\frac{\pi}{2}PW_{50}\delta_S/3T\right)\cdot\frac{3T}{T_m}\right\} \qquad [\text{Eqn. 41}]$$

Finally, for the computation of $X_S$ in step 78, a formula for $X_S$ can be developed from Eqns. 32 as follows:

$$X_S = (PE_m)^{\frac{T_m}{3T}} \qquad [\text{Eqn. 42}]$$

Step Three: Returning to FIG. 7, in the next step 80, the process of step 62 is repeated at the higher flux change density $D_h=D$, which is the flux transition density at which step 52 is performed. Thus, $T_h=1/f_h=T$ is the bit cell period at this density $D_h$ and the square wave frequency $f_{sq}=f/5$. So, referring again to FIG. 9 for more detail, step 76 is performed using Eqn. 43 because of the possible existence of partial erasure at this higher density, $$PE_h = e^{\frac{\pi}{2}PW_{50}(\delta_S - 2\delta_P)/T} \qquad [\text{Eqn. 43}]$$

Finally, in step 78, a new parameter $X_h$ is now defined and computed as follows, using Eqn. 43 and 32:

$$X_h = e^{\frac{\pi}{2}PW_{50}(\delta_S - 2\delta_P)/3T} = (PE_h)^{\frac{1}{3}} \qquad [\text{Eqn. 44}]$$

Figure 10:
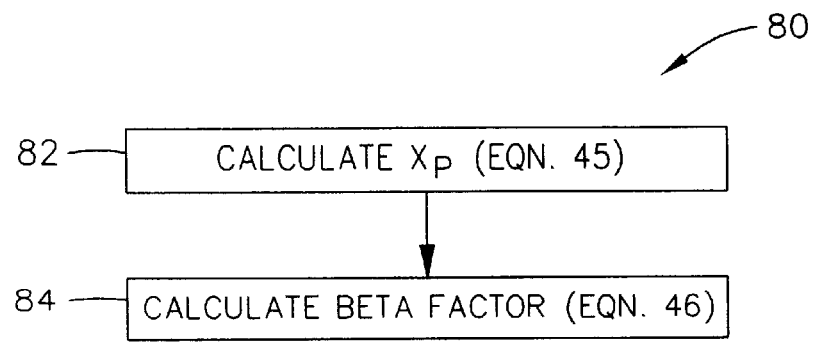
FIG. 10 is a block diagram of a flowchart illustrating the NLTS and beta factor computation method of this invention from FIG. 7.

Step Four: In the step 82 of FIG. 7, the correction factor $\beta$ of this invention is computed. FIG. 10 provides some additional detail for step 82 of FIG. 7. In the first step 82 in FIG. 10, $X_P$ is computed according to Eqn. 45, which is obtained by combining Eqns. 44 and 32 to yield:

$$X_P = \left(\frac{X_S}{X_h}\right)^{\frac{1}{2}} \qquad [\text{Eqn. 45}]$$

Substituting Eqn. 45 into Eqn. 33 provides the value of the correction factor $\beta$ in terms of $X_S$ and $X_h$. The step 84 (FIG. 10) computes the Beta factor as follows:

$$\beta = 1 - \left(\frac{X_S}{X_P}\right) = 1 - \sqrt{X_S \cdot X_h} \qquad [\text{Eqn. 46}]$$

Step Five: The final step 86 of FIG. 7 calculates the NLTS value of this invention in percent. With the values of X and $\beta$ available from steps 52 and 82, respectively, Eqn. 39 yields the measured value for $\Delta$, as follows:

$$\Delta = \frac{\left[-\frac{\sqrt{3}}{2}\beta + \frac{1}{2}\sqrt{4\gamma X^2 - (4\gamma - 3)\beta^2}\right]}{1 - \frac{\beta}{2}} \qquad [\text{Eqn. 47}]$$

and finally NLTS (in %) is merely $d/T=3\Delta/\pi$.

The advantages of the new method of this invention include the capacity to use the beta factor to characterize the PE and GMR NTC effects quantitatively for the first time. The above discussion demonstrates that the effects of pulse shape distortion are more significant than the effects of pulse amplitude reduction in the time domain. Moreover, the nonlinearity effect can be seen to increase exponentially with decreases in bit cell period T (that is, with increases in channel density PW50/T), according to the beta correction factor expression in Eqn. 31. These advantages and other features of the method of this invention may be readily appreciated with reference to the following discussion of measurements performed by the inventors for an exemplary 50 nm merged GMR head.

Figure 11:
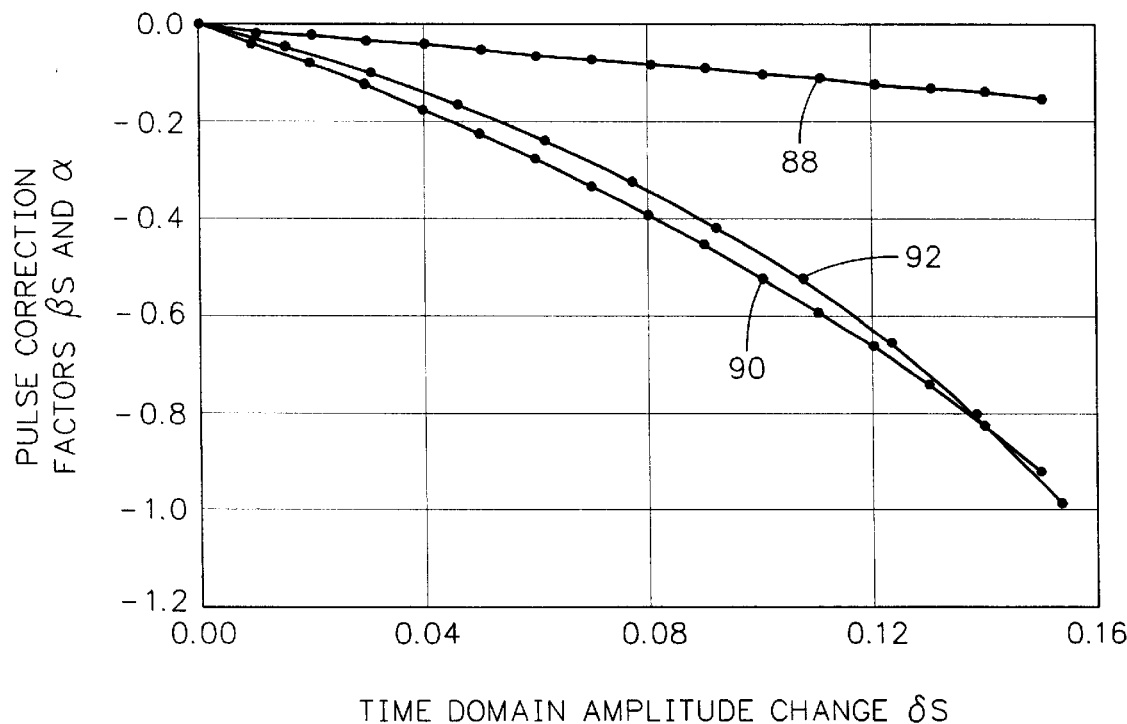
FIG. 11 is a chart displaying the pulse correction factors Alpha and Beta versus time domain amplitude change $v_S$ from GMR saturation as computed by the inventors for $PW_{50}/T=2.5$.

FIG. 11 is a chart displaying the pulse correction factors Alpha and Beta versus time domain amplitude change $\delta_S$ from GMR saturation as computed by the inventors for $PW_{50}/T=2.5$. The line 88 represents the computed Alpha factor, which does not change much with loss of pulse amplitude. The line 90 represents the computed Beta factor of this invention, which drops to accommodate pulse amplitude loss effects. The line 92 represents the simulated behavior of the Beta factor and demonstrates the improved accuracy of the method of this invention.

Figure 12:
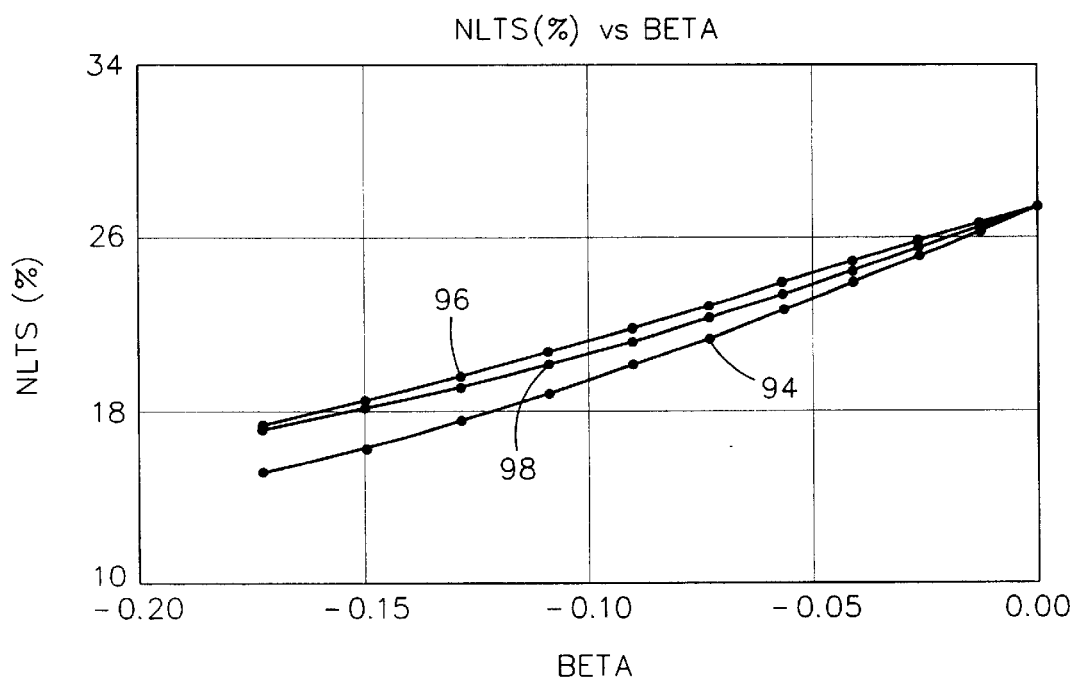
FIG. 12 is a chart displaying the NLTS according to the method of this invention from Eqn. 39 and the prior method from Eqn. 14 versus the Beta factor as computed by the inventors.

FIG. 12 is a chart displaying the measured NLTS values characterized by X versus the Beta factor according to the two different methods and simulation results for a certain value of Δ, which is determined by the true NLTS value. The value of Δ corresponds to the interception of each line with the vertical line, β=0. The line 94 represents X versus Beta according to methods from the prior art (Eqn. 14 with β, instead of α), the line 96 represents X versus Beta according to the new method of this invention (Eqn. 38) and line 98 represents a simulation data and demonstrates the improved accuracy of the method of this invention.

Figure 13:
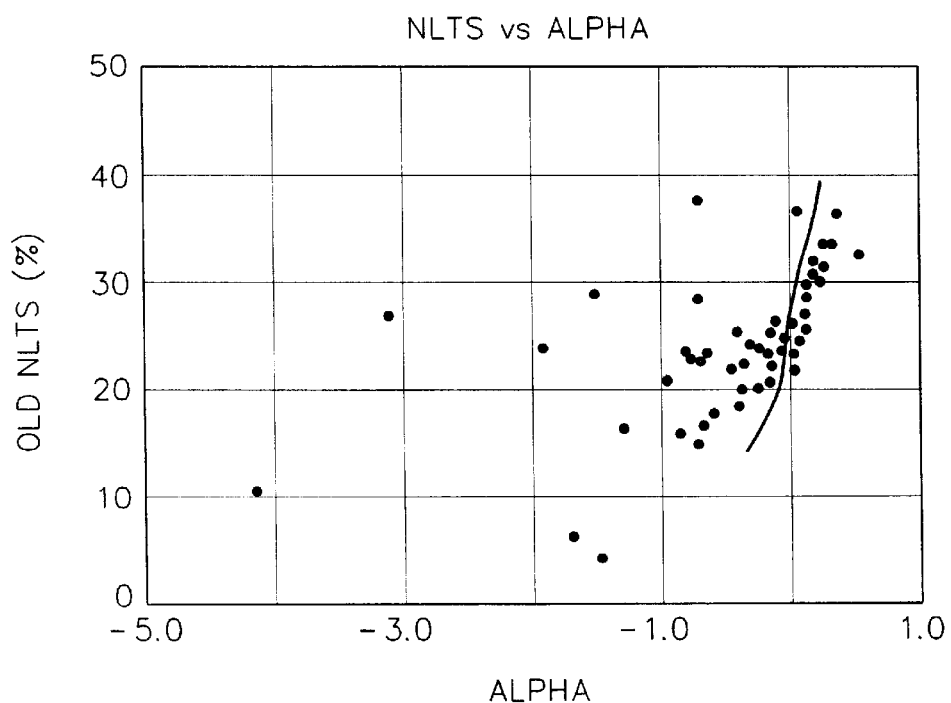
FIG. 13 is a chart displaying the NLTS from the prior art according to Eqn. 4 versus the Alpha factor from the prior art according to Eqn. 11 as measured by the inventors for an exemplary 50 nm merged-head design.
Figure 14:
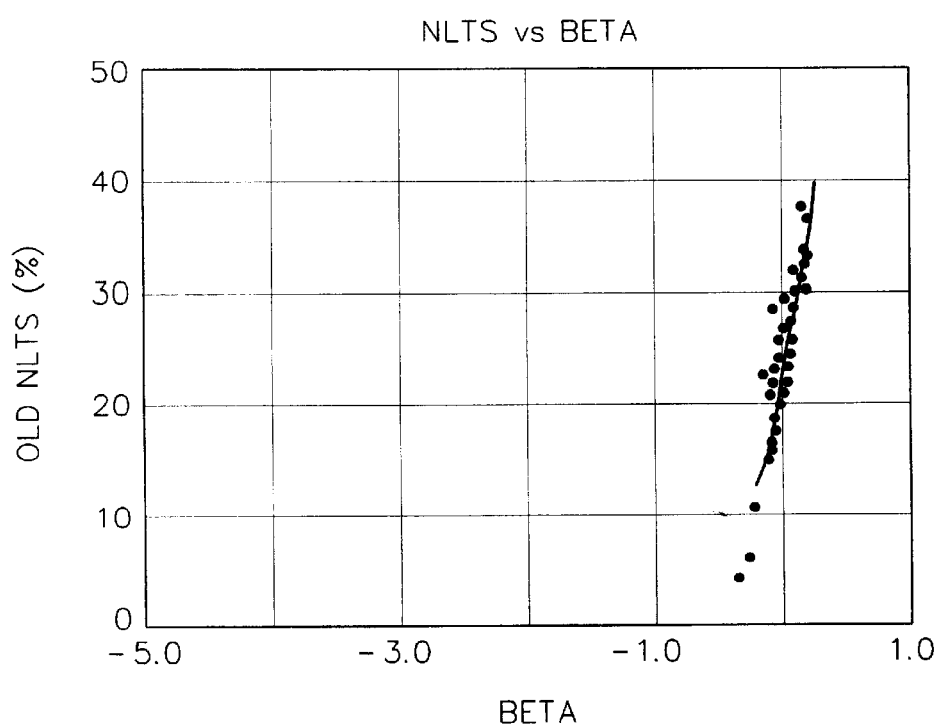
FIG. 14 is a chart displaying the NLTS from the prior art according to Eqn. 4 versus the Beta factor of this invention according to Eqn. 29 as measured by the inventors for an exemplary 50 nm merged-head design.

FIG. 13 is a chart displaying the NLTS from the prior art according to Eqn. 4 versus the Alpha factor from the prior art according to Eqn. 11 as measured by the inventors for an exemplary 50 nm merged-head design. FIG. 14 is a chart displaying the NLTS from the prior art according to Eqn. 4 versus the Beta factor of this invention according to Eqn. 33 as measured by the inventors for the same design. Note that the prior art measured NLTS values do not correlate well with the Alpha factors in FIG. 13 but correlate better with the Beta factors of this invention in FIG. 14. The line in these two charts is from Eqn. 14. We can consider Eqn. 14 as a first approximation of the absolutely precise NLTS equation and Eqn. 38 is second approximation. This correlation indicates that the old nonlinearity correlation factor Alpha does not fit the theoretical curve well even for the first order approximation of theory.

Figure 15:
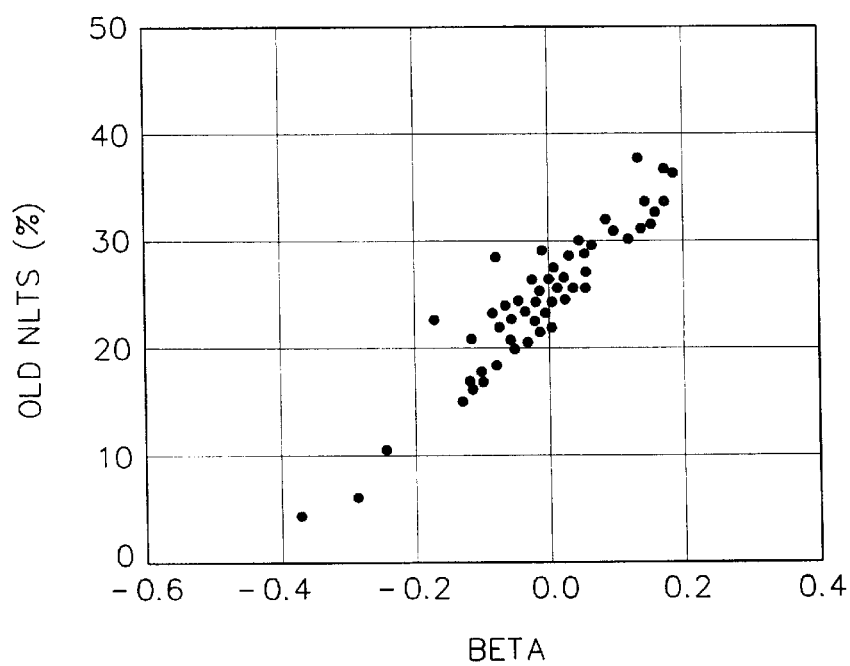
FIG. 15 is the chart of FIG. 14 rescaled for comparison to FIG. 16 herein.
Figure 16:
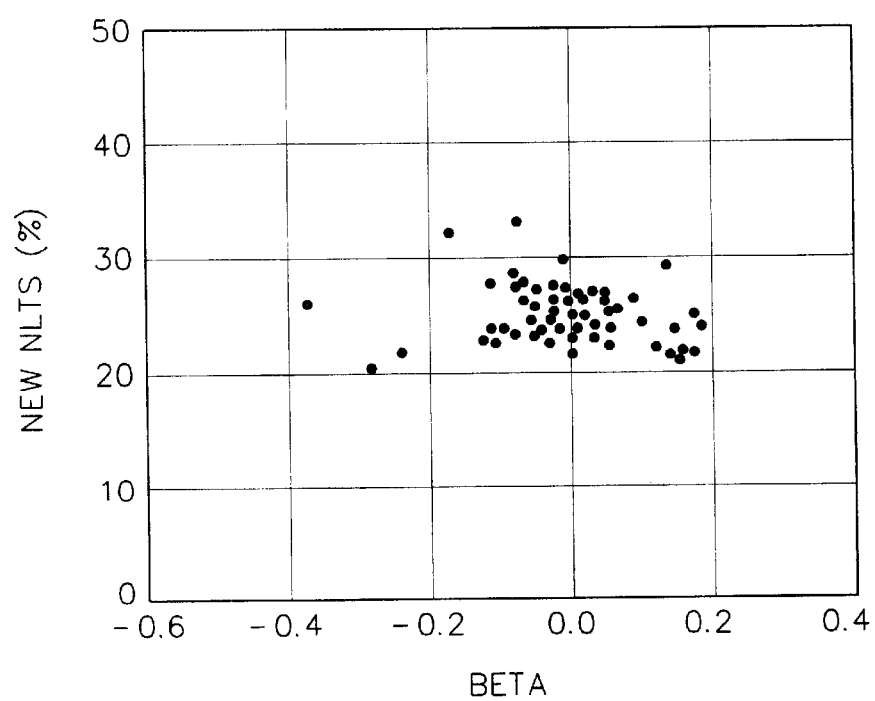
FIG. 16 is a chart displaying the NLTS according to the method of this invention from Eqn. 39 versus the Beta factor of this invention according to Eqn. 29 as measured by the inventors for an exemplary 50 nm merged-head design.

FIG. 15 is the prior art NLTS chart of FIG. 14 rescaled for comparison to FIG. 16, which is a chart displaying the NLTS according to the method of this invention from Eqn. 39 versus the Beta factor of this invention according to Eqn. 33 as measured by the inventors for an exemplary 50 nm merged-head design. Note that the NLTS measurements of this invention are nearly decorrelated with the Beta factors in FIG. 16, when compared to FIG. 15 and ignoring noise. Any remaining correlation may be reasonably attributed to the assumptions recited above, including the Lorentzian pulse shape assumption of Eqn. 18.

Figure 17:
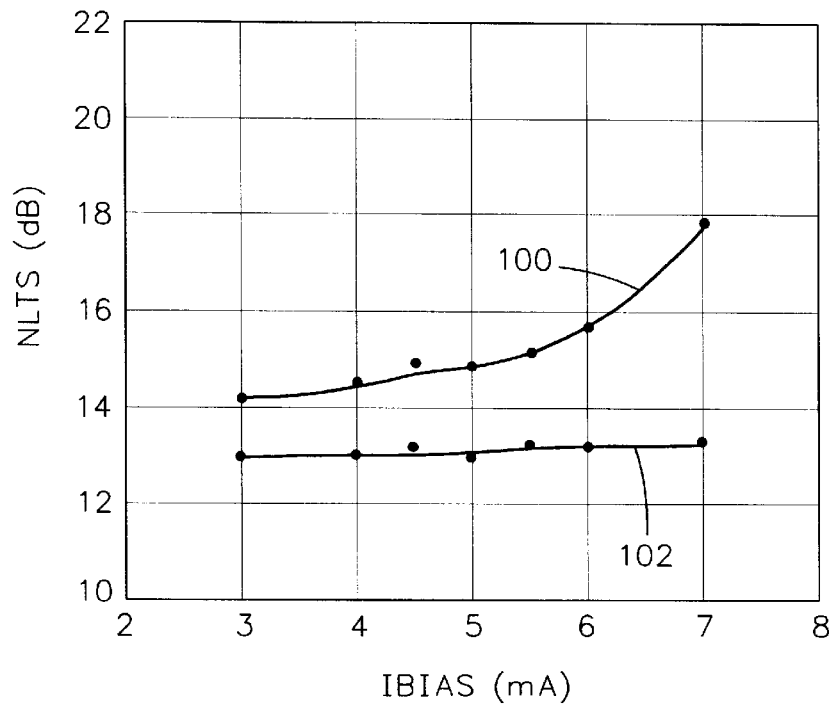
FIG. 17 is a chart displaying the NLTS according to two methods versus GMR sensor bias current as measured by the inventors for an exemplary 50 nm merged-head design.

FIG. 17 is a chart displaying the NLTS versus GMR sensor bias current as measured by the inventors for an exemplary 50 nm merged-head design. The line 100 depicts the NLTS measured according to the methods of the prior art and the line 102 depicts the NLTS measured in accordance with the method of this invention. Note that line 102 is practically independent of GMR sensor bias current.

Figure 18:
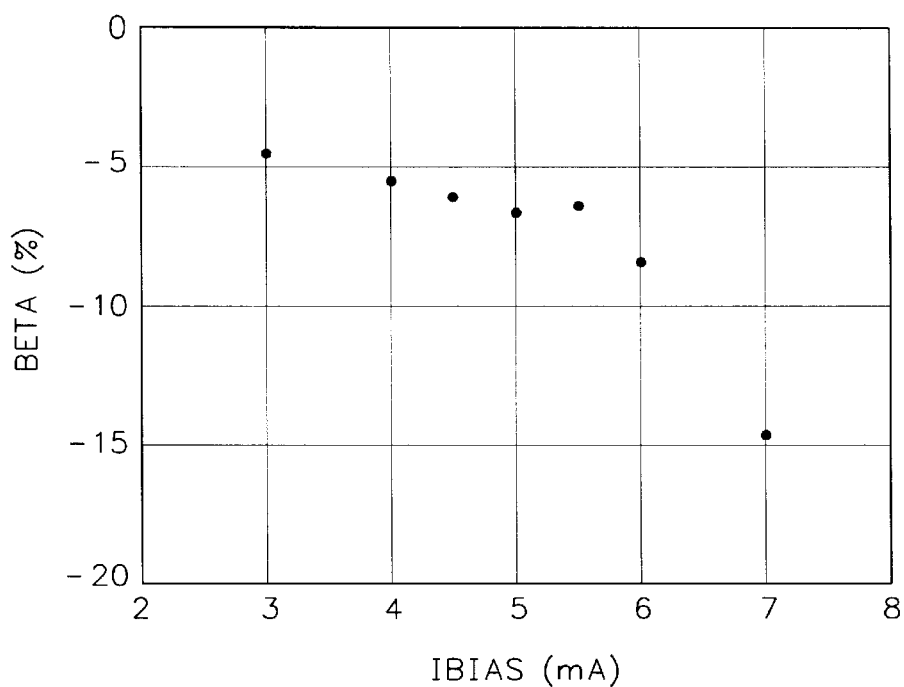
FIG. 18 is a chart displaying the Beta factor of this invention according to Eqn. 29 versus GMR sensor bias current as measured by the inventors for an exemplary 50 nm merged-head design.

FIG. 18 is a chart displaying the Beta factor of this invention according to Eqn. 33 versus GMR sensor bias current as measured by the inventors for an exemplary 50 nm merged-head design. Note that the Beta factor of this invention changes to correct for increased GMR NTC saturation at higher bias currents.

Figure 19:
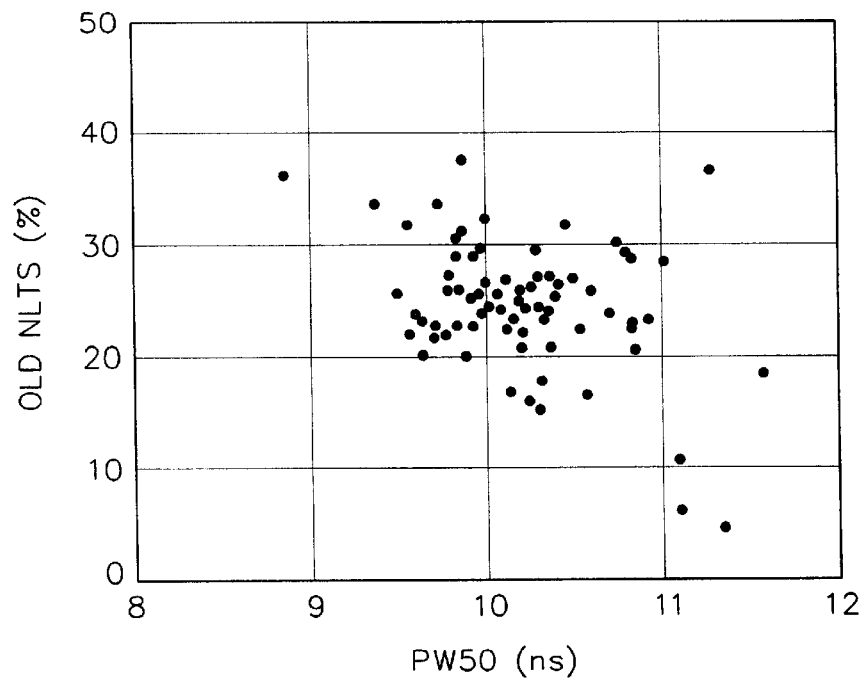
FIG. 19 is a chart displaying the NLTS from the prior art according to Eqn. 4 versus pulse width as measured by the inventors for an exemplary 50 nm merged-head design.
Figure 20:
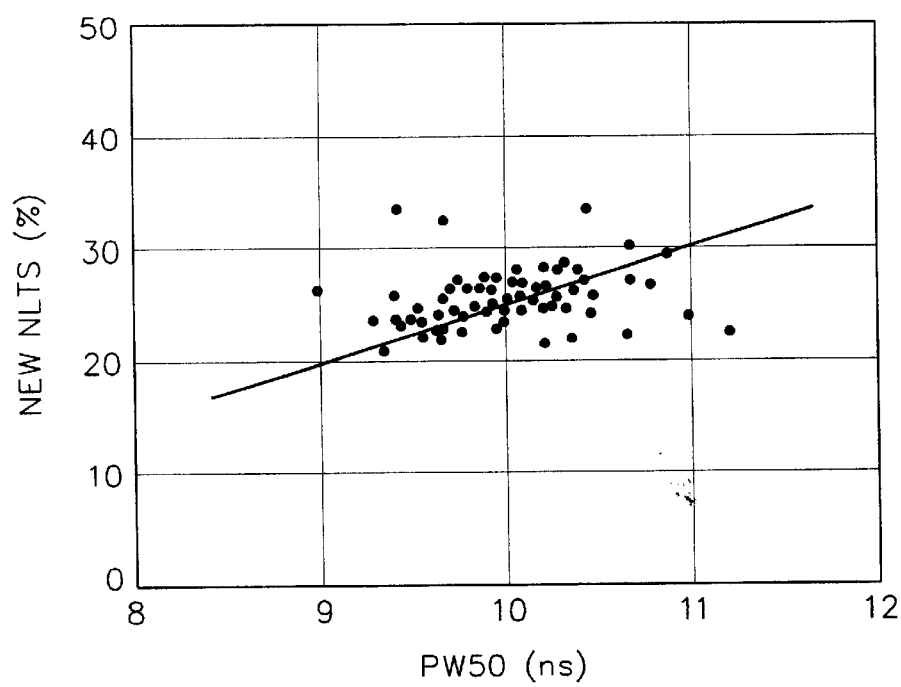
FIG. 20 is a chart displaying the NLTS according to the method of this invention from Eqn. 39 versus pulse width as measured by the inventors for an exemplary 50 nm merged-head design.

FIG. 19 is a chart displaying the NLTS from the prior art according to Eqn. 4 versus pulse width as measured by the inventors for an exemplary 50 nm merged-head design. FIG. 20 is a chart displaying the NLTS according to the method of this invention from Eqn. 39 versus pulse width as measured by the inventors using the same heads. Note that the prior art NLTS data in FIG. 19 suggests decreasing NLTS with increasing pulse width, which is contrary to the expected relationship. The NLTS data made according to the method of this invention in FIG. 20 exhibit the expected increase in NLTS with increasing pulse width.

Figure 21:
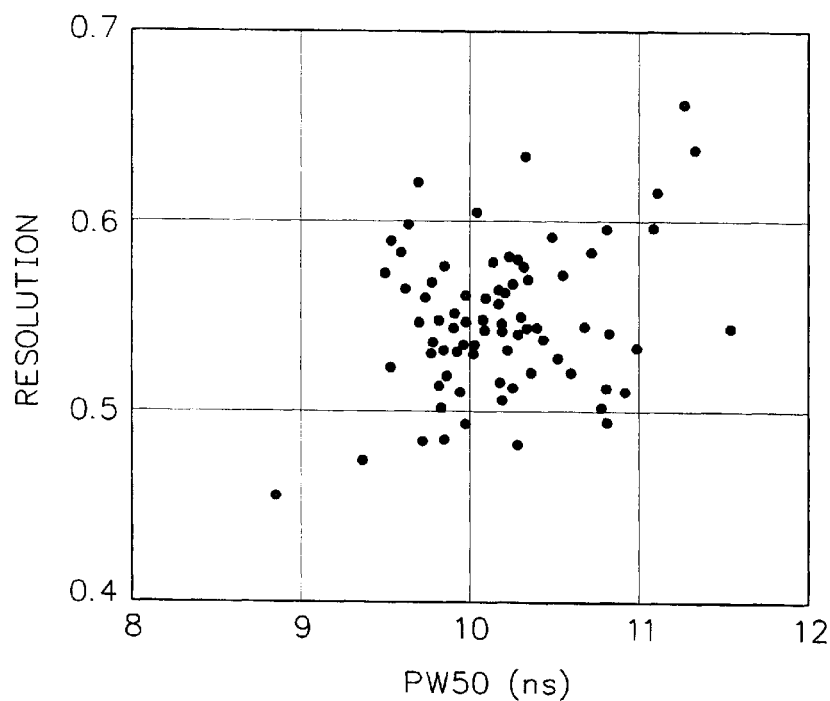
FIG. 21 is a chart displaying resolution versus pulse width measurements using methods from the prior art as measured by the inventors for an exemplary 50 nm merged-head design.
Figure 22:
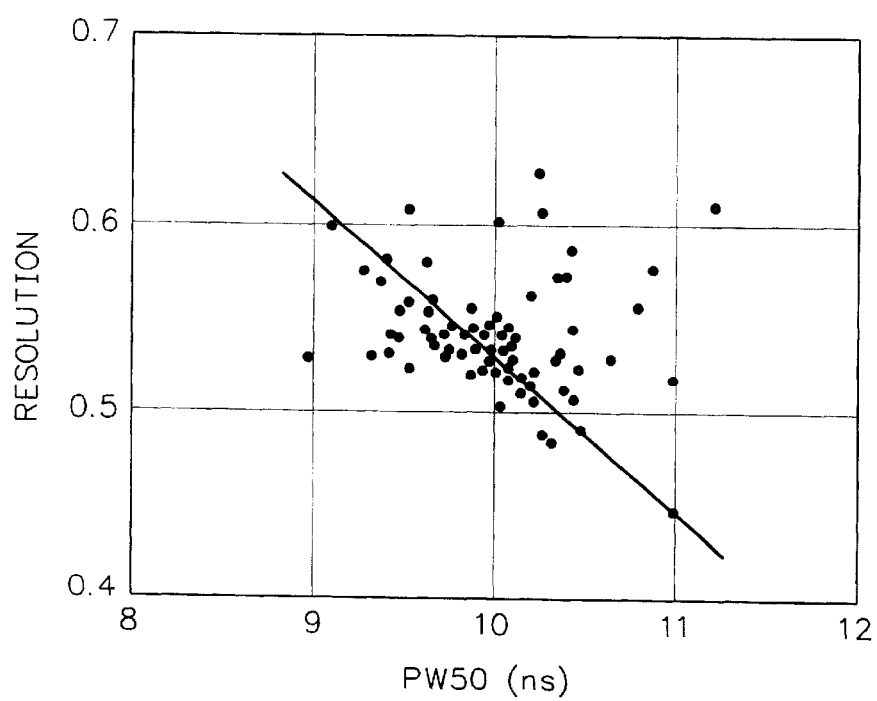
FIG. 22 is a chart displaying resolution versus pulse width measured according to the method of this invention as measured by the inventors for an exemplary 50 nm merged-head design.

FIG. 21 is a chart displaying resolution versus pulse width measurements using methods from the prior art as measured by the inventors for an exemplary 50 nm merged-head design. FIG. 22 is a chart displaying resolution versus pulse width measured according th the method of this invention as measured by the inventors using the same heads. Again, the expected relationship is seen in FIG. 22 (the new NLTS method) but FIG. 21 (the prior art NLTS method) appears to suggest a contrary relationship. As mentioned above, the scatter in FIGS. 20 and 22 is probably a result of the several assumptions discussed above in connection with the development of the method of this invention.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A method for characterizing the non-linear transition shift (NLTS) of two adjacent magnetic flux transitions created in a magnetic storage medium at a clock rate of 1/T by a write head and reproduced from the magnetic storage medium by a read head, the method comprising the steps of:

(a) performing a fifth harmonic elimination (5HE) test using a NLTS pattern having a bit period T to measure a first transition signal nonlinearity value X;

(b) performing a partial erasure (PE) test using a first square wave signal having a second bit period $T_m > T$ and a second square wave signal having a third bit period $5T_m$ to measure a second transition signal nonlinearity value $X_S$;

(c) performing a PE test using a third square wave signal having the bit period T and a fourth square wave signal having a fourth bit period 5T to measure a third transition signal nonlinearity value $X_h$; and (d) computing the NLTS by combining the first, second and third transition signal nonlinearity values.

2. The method of claim 1 wherein the first performing step (a) comprises the steps of:

(a.1) writing a repeated sequence of alternating single and double flux transitions on the data storage medium at a write clock rate of 1/T;

(a.2) reading the repeated alternating single and double transition sequence to form a first readback signal having a fundamental frequency $f_0$;

(a.3) measuring the amplitude of the fifth harmonic $V_1(f_0, 5)$ of the first readback signal;

(a.4) writing a repeated sequence of single flux transitions on the data storage medium at a write clock rate of 1/T;

(a.5) reading the repeated single transition sequence to form a second readback signal having a fundamental frequency $f_0$;

(a.6) measuring the amplitude of the fifth harmonic $V_2(f_0, 5)$ of the second readback signal; and (a.5) computing the ratio $X = V_1(f_0, 5)/V_2(f_0, 5)$.

3. The process of claim 2 wherein the second performing step (b) comprises the steps of:

(b.1) writing a second repeated sequence of single flux transitions on the data storage medium at a write clock rate of $1/5T_m$;

(b.2) reading the second repeated single flux transition sequence to form a third readback signal having a fundamental frequency $f_1$;

(b.3) measuring the amplitude of the fifth harmonic $V(f_1, 5)$ of the third readback signal;

(b.4) writing a third repeated sequence of single flux transitions on the data storage medium at a write clock rate of $1/T_m$;

(b.5) reading the third repeated single flux transition sequence to form a fourth readback signal having a fundamental frequency of $5f_1$;

(b.6) measuring the amplitude of the fundamental component $V(5f_1, 1)$ of the fourth readback signal; and (b.7) computing the second transition signal nonlinearity value $X_S$ from the ratio $PE_m=V(f_1, 5)/V(5f_1, 1)$.

4. The process of claim 3 wherein the third performing step (c) comprises the steps of:

(c.1) writing a fourth repeated sequence of single flux transitions on the data storage medium at a write clock rate of 1/5T;

(c.2) reading the fourth repeated single flux transition sequence to form a fifth readback signal having the fundamental frequency $f_0$;

(c.3) measuring the amplitude of the fifth harmonic $V(f_0, 5)$ of the fifth readback signal;

(c.4) writing a fifth repeated sequence of single flux transitions on the data storage medium at a write clock rate of T;

(c.5) reading the fifth repeated single flux transition sequence to form a sixth readback signal having a fundamental frequency of $5f_0$;

(c.6) measuring the amplitude of the fundamental component $V(5f_0, 1)$ of the sixth readback signal; and (c.7) computing the third transition signal nonlinearity value $X_h$ from the ratio $PE_h=V(f_0, 5)/V(5f_0, 1)$.

5. The process of claim 2 wherein the third performing step (c) comprises the steps of:

(c.1) writing a second repeated sequence of single flux transitions on the data storage medium at a write clock rate of 1/5T;

(c.2) reading the second repeated single flux transition sequence to form a third readback signal having the fundamental frequency $f_0$;

(c.3) measuring the amplitude of the fifth harmonic $V(f_0, 5)$ of the third readback signal;

(c.4) writing a third repeated sequence of single flux transitions on the data storage medium at a write clock rate of T; (c.5) reading the third repeated single flux transition sequence to form a fourth readback signal having a fundamental frequency of $5f_0$;

(c.6) measuring the amplitude of the fundamental component $V(5f_0, 1)$ of the fourth readback signal; and (c.7) computing the third transition signal nonlinearity value $X_h$ from the ratio $PE_h=V(f_0, 5)/V(5f_0, 1)$.

6. The process of claim 1 wherein the second performing step (b) comprises the steps of:

(b.1) writing a first repeated sequence of single flux transitions on the data storage medium at a write clock rate of $1/5T_m$;

(b.2) reading the first repeated single flux transition sequence to form a first readback signal having a fundamental frequency $f_1$;

(b.3) measuring the amplitude of the fifth harmonic $V(f_1, 5)$ of the first readback signal;

(b.4) writing a second repeated sequence of single flux transitions on the data storage medium at a write clock rate of $1/T_m$;

(b.5) reading the second repeated single flux transition sequence to form a second readback signal having a fundamental frequency of $5f_1$;

(b.6) measuring the amplitude of the fundamental component $V(5f_1, 1)$ of the second readback signal; and (b.7) computing the second transition signal nonlinearity value $X_S$ from the ratio $PE_m=V(f_1, 5)/V(5f_1, 1)$.

7. The process of claim 3 wherein the third performing step (c) comprises the steps of:

(c.1) writing a third repeated sequence of single flux transitions on the data storage medium at a write clock rate of 1/5T;

(c.2) reading the third repeated single flux transition sequence to form a third readback signal having the fundamental frequency $f_0$;

(c.3) measuring the amplitude of the fifth harmonic $V(f_0, 5)$ of the third readback signal;

(c.4) writing a fourth repeated sequence of single flux transitions on the data storage medium at a write clock rate of T;

(c.5) reading the fourth repeated single flux transition sequence to form a fourth readback signal having a fundamental frequency of $5f_0$;

(c.6) measuring the amplitude of the fundamental component $V(5f_0, 1)$ of the fourth readback signal; and (c.7) computing the third transition signal nonlinearity value $X_h$ from the ratio $PE_h=V(f_0, 5)/V(5f_0, 1)$.

8. The process of claim 1 wherein the third performing step (c) comprises the steps of:

(c.1) writing a first repeated sequence of single flux transitions on the data storage medium at a write clock rate of 1/5T;

(c.2) reading the first repeated single flux transition sequence to form a first readback signal having the fundamental frequency $f_0$;

(c.3) measuring the amplitude of the fifth harmonic $V(f_0, 5)$ of the first readback signal;

(c.4) writing a second repeated sequence of single flux transitions on the data storage medium at a write clock rate of T;

(c.5) reading the second repeated single flux transition sequence to form a second readback signal having a fundamental frequency of $5f_0$;

(c.6) measuring the amplitude of the fundamental component $V(5f_0, 1)$ of the second readback signal; and (c.7) computing the third transition signal nonlinearity value $X_h$ from the ratio $PE_h=V(f_0, 5)/V(5f_0, 1)$.

* * * * *